United States Patent
Murakata

(10) Patent No.: US 8,294,954 B2
(45) Date of Patent: Oct. 23, 2012

(54) IMAGE FORMING APPARATUS AND METHOD FOR REDUCING THE DIFFERENCE OF IMAGE QUALITIES BETWEEN THE IMAGE DATA READ BY A PLURALITY OF READING UNITS

(75) Inventor: Akira Murakata, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 804 days.

(21) Appl. No.: 12/482,714

(22) Filed: Jun. 11, 2009

(65) Prior Publication Data
US 2010/0007925 A1    Jan. 14, 2010

(30) Foreign Application Priority Data
Jul. 14, 2008 (JP) ................. 2008-183178

(51) Int. Cl.
*H04N 1/407* (2006.01)
*G06K 9/40* (2006.01)

(52) U.S. Cl. .......... 358/3.26; 358/1.9; 358/2.1; 358/3.1; 358/3.27; 358/1.13; 358/516; 358/518; 358/520; 358/521; 358/537; 358/538; 358/539; 358/540; 358/444; 358/474; 358/483; 358/488; 358/498; 382/100; 382/167; 382/274; 101/211; 101/365

(58) Field of Classification Search .................. None
See application file for complete search history.

(56) References Cited

U.S. PATENT DOCUMENTS

| | | | | |
|---|---|---|---|---|
| 7,626,735 B2 * | 12/2009 | Mizuhashi et al. | ........... | 358/474 |
| 7,729,023 B2 * | 6/2010 | Morikawa | ...................... | 358/521 |
| 7,751,099 B2 * | 7/2010 | Mizuhashi et al. | ........... | 358/488 |
| 2008/0013133 A1 * | 1/2008 | Taguchi | ........................ | 358/514 |
| 2008/0100881 A1 | 5/2008 | Yamada | | |

FOREIGN PATENT DOCUMENTS

| | | | |
|---|---|---|---|
| JP | 2005-12442 | | 1/2005 |
| JP | 2005-012442 | * | 1/2005 |
| JP | 2005-25072 | | 1/2005 |
| JP | 2005-025072 | * | 1/2005 |
| JP | 2006-135631 | * | 5/2006 |
| JP | 2006-217030 | | 8/2006 |

* cited by examiner

*Primary Examiner* — Steven Kau
(74) *Attorney, Agent, or Firm* — Oblon, Spivak, McClelland, Maier & Neustadt, L.L.P.

(57) ABSTRACT

An image processing controlling unit calculates an image processing parameter to reduce an image quality difference between image data read by a first reading unit and a second reading unit depending on a reading characteristic of a reading unit indicated by attached information (reading-unit information) received together with the calculating request and a writing characteristic of a printer. The calculated image processing parameter is stored in a memory. Next, when printing the image data, a middleware unit causes a printer to print the image data based on the image processing parameter held in the memory.

12 Claims, 21 Drawing Sheets

FIG. 5

| APPLICATION | ONE SIDE | BOTH SIDES CONCURRENTLY |
|---|---|---|
| COPYING | (1) (4) | (1) (2) (3) (4) |
| SCANNING | (1) | (1) (2) (3) |
| FAXING (SENDING) | (1) | (1) (2) (3) |
| FAXING (RECEIVING) | (4) | (4) |
| DOCUMENT BOXING (STORING) | (1) | (1) (2) (3) |
| DOCUMENT BOXING (PRINTING) | (4) | (4) |
| PRINTING | (4) | (4) |

CALL TIMING OF SCAN PROCESS BY HOST CONTROLLING UNIT

CALL TIMING OF PLOTTER PROCESS BY HOST CONTROLLING UNIT

TIME

FIG. 12A

| A | B | C | D | E | F | G |
|---|---|---|---|---|---|---|
| H | I | J | K | L | M | N |
| O | P | Q | * | | | |

*: PIXEL-OF-INTEREST

WEIGHTING TABLE
FOR SCANNER CCD

FIG. 12B

| A' | B' | C' | D' | E' | F' | G' |
|----|----|----|----|----|----|----|
| H' | I' | J' | K' | L' | M' | N' |
| O' | P' | Q' | *  |    |    |    |

*: PIXEL-OF-INTEREST

WEIGHTING TABLE
FOR CONTACT
IMAGE SENSOR CIS

FIG. 12C

| A" | B" | C" | D" | E" | F" | G" |
|----|----|----|----|----|----|----|
| H" | I" | J" | K" | L" | M" | N" |
| O" | P" | Q" | *  |    |    |    |

*: PIXEL-OF-INTEREST

WEIGHTING TABLE
FOR MIXTURE OF
SCANNER CCD
AND CONTACT IMAGE
SENSOR CIS

FIG. 14

CALCULATION RESULT OF IMAGE PROCESSING
PARAMETER SET IN ADAPTIVE GAMMA PROCESSING

| PARAMETER SWITCHED DEPENDING ON TYPE OF APPLICATION<br>INDEX NUMBER 1 | PARAMETER SWITCHED DEPENDING ON IMAGE QUALITY MODE<br>INDEX NUMBER 2 |
|---|---|

PARAMETER SWITCHED DEPENDING ON SCANNER CCD,
AND CONTACT IMAGE SENSOR CIS,
AND MIXTURE OF SCANNER CCD AND CONTACT IMAGE SENSOR CIS

| PARAMETER SWITCHED DEPENDING ON TYPE OF APPLICATION AND READING DEVICE INFORMATION<br>INDEX NUMBER 3 | PARAMETER SWITCHED DEPENDING ON COLOR MODE AND READING DEVICE INFORMATION<br>INDEX NUMBER 4 |
|---|---|

FIG. 17

```
const u_char Tbl[REQUEST LEVEL 1][REQUEST LEVEL 2][REQUEST LEVEL 3][2]={
{
    { {P2, D2}, {P2, D2}, {P2, D2}, {P2, D2}},
    { {P0, D0}, {P0, D0}, {P0, D0}, {P0, D0}},
    { {P3, D3}, {P3, D3}, {P3, D3}, {P3, D3}},
},
{
    { {P4, D4}, {P4, D4}, {P4, D4}, {P4, D4}},
    { {P5, D5}, {P5, D5}, {P5, D5}, {P5, D5}},
    { {P6, D6}, {P6, D6}, {P6, D6}, {P6, D6}},
},
{
    { {P7, DE}, {P7, D7}, {P7, D7}, {P7, D7}},
    { {P8, D8}, {P8, D8}, {P8, D8}, {P8, D8}},
    { {P9, D9}, {P9, D9}, {P9, D9}, {P9, D9}},
},
{
    { {P10, D10}, {P10, D10}, {P10, D10}, {P10, D10}},
    { {P11, D11}, {P11, D11}, {P11, D11}, {P11, D11}},
    { {P12, D12}, {P12, D12}, {P12, D12}, {P12, D12}},
},
{
    { {P13, D13}, {P13, D13}, {P13, D13}, {P13, D13}},
    { {P14, D14}, {P14, D14}, {P14, D14}, {P14, D14}},
    { {P15, D15}, {P15, D15}, {P15, D15}, {P15, D15}},
}
};
```

FIG. 18

EXAMPLE:

ADAPTIVE GAMMA PROCESSING
  PROGRAM A
    DATA A (γ DATA)
  ARE INCLUDED.

```
//COMPUTER PROGRAM CODE ENTITY
const u_long RipLib[]={

/*-----PROGRAM A--------*/        //VARIATION A
    0×0000040d, 0×0000140d, 0×18030c01, 0×00000000,
    0×0400c010, 0×64c90e00, 0×00000000, 0×38080cc0,
    0×1000c01c, 0×c000c11c, 0×08030c05, 0×04031c05,
    0×00001409, 0×00000409, 0×00000010,
    /*-----PROGRAM A--------*/        //VARIATION B
    0×0000040d, 0×0000c01c, 0×58080c05, 0×02b40c01,
    0×00000000, 0×0300c002, 0×eccb0e00, 0×00000000,
    0×0000c01c, 0×0100c000, 0×02b40c05, 0×f007c01c,
    0×50b42c01, 0×c2010c05, 0×0100c202, 0×18cc0e00,
    0×00000000, 0×ccb01c01, 0×00000000, 0×c6011c05,
    0×e000c01c, 0×c6010c05, 0×bf00c01c,
                       :
                       :
```

※ ONE UNIT OF COMPUTER PROGRAM HAS TWO WORDS,
AND IS SET AS HIGHER ORDER 16 BITS AND LOWER ORDER 16 BITS.

```
const u_short FilB_Tbl[1][256]={
//DATA A

EXAMPLE: SINGLE REGISTER HAS BASICALLY SINGLE WORD (16 BITS)

FILTER PROCESSING
REGISTER A (HIGHER ORDER 8 BITS: LONG MATRIX SIZE
LOWER ORDER 8 BITS: WIDE MATRIX SIZE)
REGISTER B (16 BITS FILTER MATRIX STRENGTH)
REGISTER C TO REGISTER Z (EACH REGISTER 16 BITS FILTER MATRIX)
ARE INCLUDED.

TABLE EXAMPLE

```
    const u_char FilA Tbl[3][2]={
    //LONG  WIDE
       {3, 5},    //VARIATION A
       {10, 10}, //VARIATION B
            :              //VARIATION C
    };

const u_char FilB Tbl[3]={
    //STRENGTH
          5,               //VARIATION A
          8,               //VARIATION B
          :              //VARIATION C
    };

const u_char FilC Tbl[2][10][10]={

//VARIATION A
          {   5, 20, 209, 158, 183, 0, 0, 0, 0, 0,
             98, 63, 183, 134, 134, 0, 0, 0, 0, 0,
            209, 158, 5, 20, 98, 0, 0, 0, 0, 0,
              0, 0, 0, 0, 0, 0, 0, 0, 0, 0,
              0, 0, 0, 0, 0, 0, 0, 0, 0, 0,
              0, 0, 0, 0, 0, 0, 0, 0, 0, 0,
              0, 0, 0, 0, 0, 0, 0, 0, 0, 0,
              0, 0, 0, 0, 0, 0, 0, 0, 0, 0,
              0, 0, 0, 0, 0, 0, 0, 0, 0, 0,
              0, 0, 0, 0, 0, 0, 0, 0, 0, 0,
```

FIG. 19B

```
},
//VARIATION B
{   11, 22, 123, 77, 33, 214, 112, 150, 207, 153,
    77, 33, 214, 112, 150, 207, 153, 11, 22, 123,
    112, 150, 207, 153, 11, 22, 123, 77, 33, 214,
    153, 11, 22, 123, 77, 33, 214, 112, 150, 207,
    123, 77, 33, 214, 112, 150, 207, 153, 11, 22,
    214, 112, 150, 207, 153, 11, 22, 123, 77, 33,
    207, 153, 11, 22, 123, 77, 33, 214, 112, 150,
    22, 123, 77, 33, 214, 112, 150, 207, 153, 11,
    33, 214, 112, 150, 207, 153, 11, 22, 123, 77,
    150, 207, 153, 11, 22, 123, 77, 33, 214, 112,
},
//VARIATION C
{
              :
              :
}
}:
```

※BECAUSE SINGLE REGISTER HAS SINGLE WORD,
TWO TABLE ELEMENTS OF FilC_Tbl ARE WRITTEN AS 16BITS,
HIGHER ORDER 8 BITS AND LOWER ORDER 8 BITS.

IMAGE FORMING APPARATUS AND METHOD FOR REDUCING THE DIFFERENCE OF IMAGE QUALITIES BETWEEN THE IMAGE DATA READ BY A PLURALITY OF READING UNITS

CROSS-REFERENCE TO RELATED APPLICATIONS

The present application claims priority to and incorporates by reference the entire contents of Japanese priority document 2008-183178 filed in Japan on Jul. 14, 2008.

BACKGROUND OF THE INVENTION

1. Field of the Invention

The present invention relates to an image processing in an image forming apparatus.

2. Description of the Related Art

Conventionally, as a example of when a copying and the like of both sides of a document is realized in a digital copier, there is a method of using a document feeder that scans the front side of the document, and then reverses the document, and scans the back side of the document. The productivity of this method is low because the reading of the front side of the document and the back side thereof cannot be performed concurrently. Recently, to achieve higher productivity, a digital copier has appeared that reads the front of the document and the back side thereof concurrently with two reading units. Furthermore, to meet demands for full-color printing and high image quality, a digital copier capable of reading and writing data at a high resolution has appeared.

However, if the demands for full color printing and high image quality and the demand for high productivity are met in one device, an image quality difference between the image data depending on a difference in the reading characteristics of the two reading units can become remarkable. To take care of this, it is necessary to reduce the image quality difference between the image data by the image processing.

Japanese Patent Application Laid-open No. 2006-135631 discloses an image forming apparatus in which the image quality difference between the image data depending on the difference in the reading characteristics of the reading units is reduced by image processing based on the reading characteristics of the reading units that are the same as each other or different from each other. This conventional image forming apparatus includes a single image processing unit that performs predetermined image processing on each of image data read by a first image reading unit and image data read by a second image reading unit, and a correction processing unit that performs processing to correct a difference between the reading characteristics of the first image reading unit and the second image reading unit on either one of the image data read by the first image reading unit and the image data read by the second image reading unit before the image processing unit performs the image processing. Thus, this image forming apparatus eliminates the image quality difference between the image data obtained separately by the two image reading units.

However, although the processing to correct the difference between the reading characteristics of the first image reading unit and the second image reading unit can be performed at a stage of the image processing by the correction processing unit where the output destination is not determined, the processing to correct the difference between the reading characteristics of the first image reading unit and the second image reading unit can not be performed at a stage of the image processing by the image processing unit where the correction is performed based on the writing characteristic of a writing unit that prints image data on a paper sheet after the output destination is determined to be the writing unit. Therefore, particularly when image data is printed on a paper sheet, it is difficult to make equal image quality to the printed images of the image data that have been read by reading units with different reading characteristics. When the image data that are acquired by reading units with different reading characteristics are printed on a single paper sheet by using a consolidating function, an image quality difference between the printed images of the image data shows up markedly.

SUMMARY OF THE INVENTION

It is an object of the present invention to at least partially solve the problems in the conventional technology.

According to an aspect of the present invention, there is provided an image forming apparatus including a plurality of reading units that separately and concurrently read a front side of a document and a back side of the document thereby acquiring image data; a first calculating unit that calculates a first image processing parameter to reduce a difference in image qualities between the image data read by the reading units based on a reading characteristic of the reading unit that has read the image data; a first image processing unit that sets the first image processing parameter and performs image processing on the image data based on the first image processing parameter thereby obtaining processed data; a storing unit that stores therein the processed data with reading-unit information indicating the reading unit that has read the image data corresponding to the processed data; a second calculating unit that calculates a second image processing parameter to reduce a difference in image qualities between the image data read by the reading units based on a reading characteristic of the reading unit indicated by the reading-unit information stored with the image processed data and a writing characteristic of a writing unit when the processed data stored in the storing unit is to be printed by the writing unit; a second image processing unit that sets the second image processing parameter and performs image processing on the processed data stored in the storing unit based on the second image processing parameter thereby obtaining printing data; and a printing unit that causes the writing unit to print the printing data.

According to another aspect of the present invention, there is provided an image forming method including reading a front side of a document and a back side of the document separately and concurrently by a plurality of reading units thereby acquiring image data; first calculating including calculating a first image processing parameter to reduce a difference in image qualities between the image data read by the reading units based on a reading characteristic of the reading unit that has read the image data; first image-processing including setting the first image processing parameter and performing image processing on the image data based on the first image processing parameter thereby obtaining processed data; storing the processed data in a storing unit with reading-unit information indicating the reading unit that has read the image data corresponding to the processed data; second calculating including calculating a second image processing parameter to reduce a difference in image qualities between the image data read by the reading units based on a reading characteristic of the reading unit indicated by the reading-unit information stored with the image processed data and a writing characteristic of a writing unit when the processed data stored in the storing unit is to be printed by the writing unit;

second image-processing including setting the second image processing parameter and performing image processing on the processed data stored in the storing unit based on the second image processing parameter thereby obtaining printing data; and causing the writing unit to print the printing data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a table for explaining combinations of flows of image date when applications of the MFP shown in FIG. 1 are executed respectively;

FIG. 12A is an example of a weighting table for the scanner CCD that is used for an image processing of image data read by the scanner CCD shown in FIG. 1;

FIG. 12B is an example of a weighting table for the contact image sensor CIS that is used for the image processing of image data read by the contact image sensor CIS shown in FIG. 1;

FIG. 12C is an example of a weighting table for a mixture of the scanner CCD and the contact image sensor CIS that is used for the image processing of image data including image read by the scanner CCD and image read by the contact image sensor CIS shown in FIG. 1;

FIG. 14 is examples of calculation results of the image processing parameters classified by controlling factors according to a second embodiment of the present invention;

FIG. 17 is an example of a table (data) indicating the image processing parameter used in the second embodiment;

FIG. 18 is an example of a table indicating the image processing parameter set in the middleware unit according to the second embodiment; and FIG. 19 is an example of a table indicating the image processing parameter set in the hardware unit according to the second embodiment.

DETAILED DESCRIPTION OF THE PREFERRED EMBODIMENTS

Exemplary embodiments of the present invention are explained in detail below with reference to the accompanying drawings. An example of a multi function peripheral (MFP) as an image forming apparatus is described below. This invention can be applied to other image processing apparatuses such as a printer, a facsimile apparatus, a scanner, or a copier.

Figure 1:
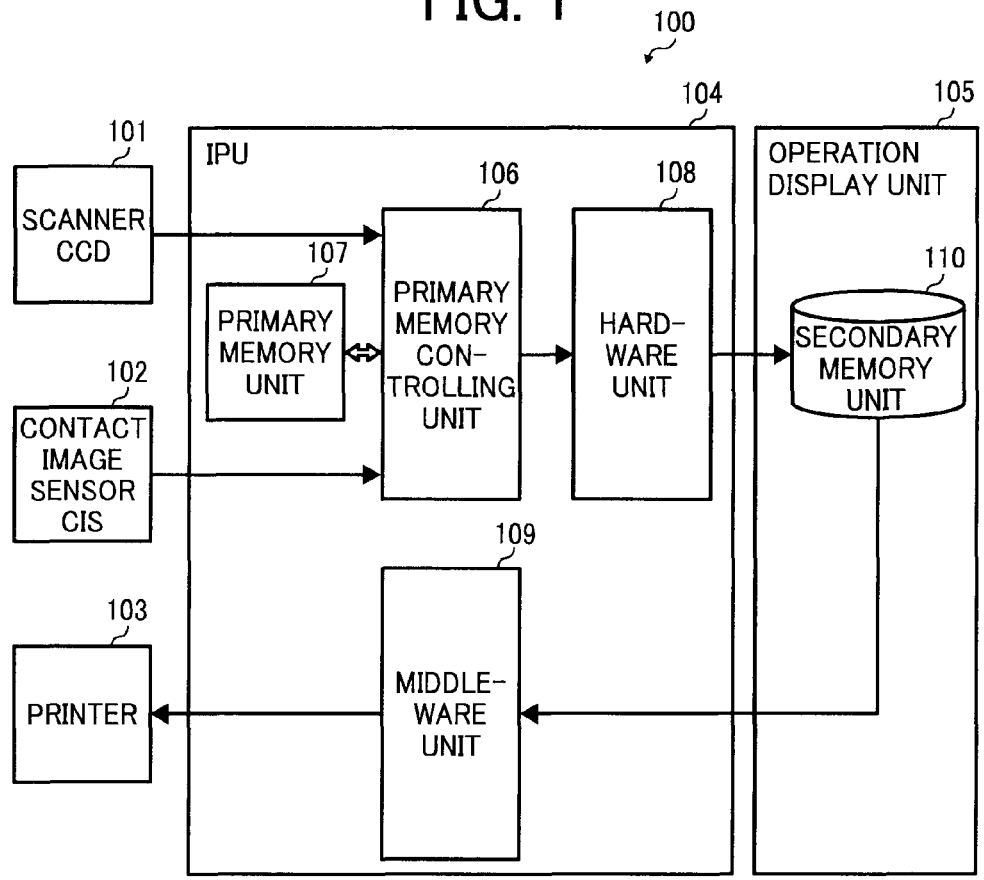
FIG. 1 is a schematic diagram of a hardware configuration of an MFP according to a first embodiment of the present invention.

FIG. 1 is a schematic diagram of a hardware configuration of an MFP according to a first embodiment of the present invention. An MFP 100 includes a scanner CCD (Charge Coupled Device) 101, a contact image sensor CIS (Contact Image Sensor) 102, a printer 103, an Imaging Processing Unit (IPU) 104, and an operation display unit 105.

The scanner CCD 101 scans a front side of a document and acquires image data of the front side. The contact image sensor CIS 102 scans a back side of the document concurrently with the scanning of the front side by the scanner CCD 101 and acquires image data of the back side. The printer 103 prints image data subjected to the image processing by the IPU 104 on a paper sheet or the like.

The IPU 104 performs image processing on the image data acquired by the scanner CCD 101 or the contact image sensor CIS 102 and the image data to be printed by the printer 103. In the embodiment, the IPU 104 includes a primary memory unit 107, a primary memory controlling unit 106, a hardware unit 108, and a middleware unit 109.

The primary memory unit 107 temporarily stores therein the image data received from the contact image sensor CIS 102.

The primary memory controlling unit 106 controls storing of the image data received from the contact image sensor CIS 102 into the primary memory unit 107 and reading out of the image data from the primary memory unit 107.

The primary memory controlling unit 106 receives the image data from the scanner CCD 101 and passes the received image data to the hardware unit 108. The primary memory controlling unit 106 reads the image data from the primary memory unit 107 and passes the read image data to the hardware unit 108.

The hardware unit 108 performs image processing on the image data read by the scanner CCD 101 or the contact image sensor CIS 102. In the embodiment, the hardware unit 108 sets an image processing parameter based on data downloaded to an ASIC (application Specific Integrated Circuit), and performs image processing on the image data read by the scanner CCD 101 or the contact image sensor CIS 102.

Figure 2:
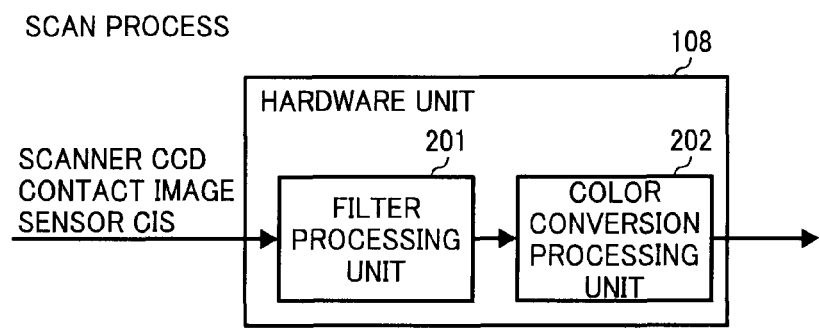
FIG. 2 is a block diagram of an example of an image processing module included in a hardware unit of the image forming apparatus shown in FIG. 1.

FIG. 2 is a block diagram of an example of an image processing module included in the hardware unit 108. In the embodiment, the hardware unit 108 includes a filter processing unit 201 and a color conversion processing unit 202. The filter processing unit 201 performs a processing for emphasizing an edge of an image of the image data, a smoothing processing for removing a noise, and a processing for approximating the MFT (Modulation Transfer Function) characteristic of an image to the image data input from the scanner CCD 101 or the contact image sensor CIS 102. The color conversion processing unit 202 performs a processing for converting image data of RGB (red, green, blue) into image data of CMYK (cyan, magenta, yellow, black).

The middleware unit 109 performs image processing on the image data to be printed by the printer 103. In the embodiment, the middleware unit 109 sets an image processing parameter based on a computer program and data downloaded to a DSP (digital signal processor), and performs image processing on the image data to be printed by the printer 103 by using the image processing parameter.

Figure 3:
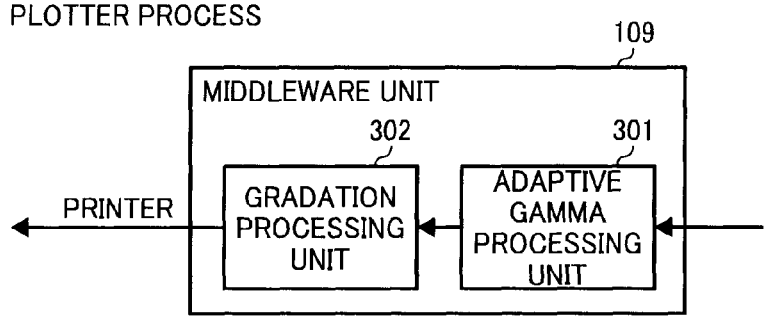
FIG. 3 is a block diagram of an example of an image processing module included in a middleware unit of the image forming apparatus shown in FIG. 1.

FIG. 3 is a block diagram of an example of an image processing module included in the middleware unit 109. In the embodiment, the middleware unit 109 includes an adaptive gamma processing unit 301 that performs gamma correction processing on the image data, and a gradation processing unit 302 that performs gradation convention processing on the image data.

The operation display unit 105 is used by a user of the MFP 100 to set processing contents and processing conditions. In the embodiment, the operation display unit 105 includes a secondary memory unit 110. The secondary memory unit 110 stores therein the image data subjected to the image processing by the hardware unit 108 and the like.

Figure 4:
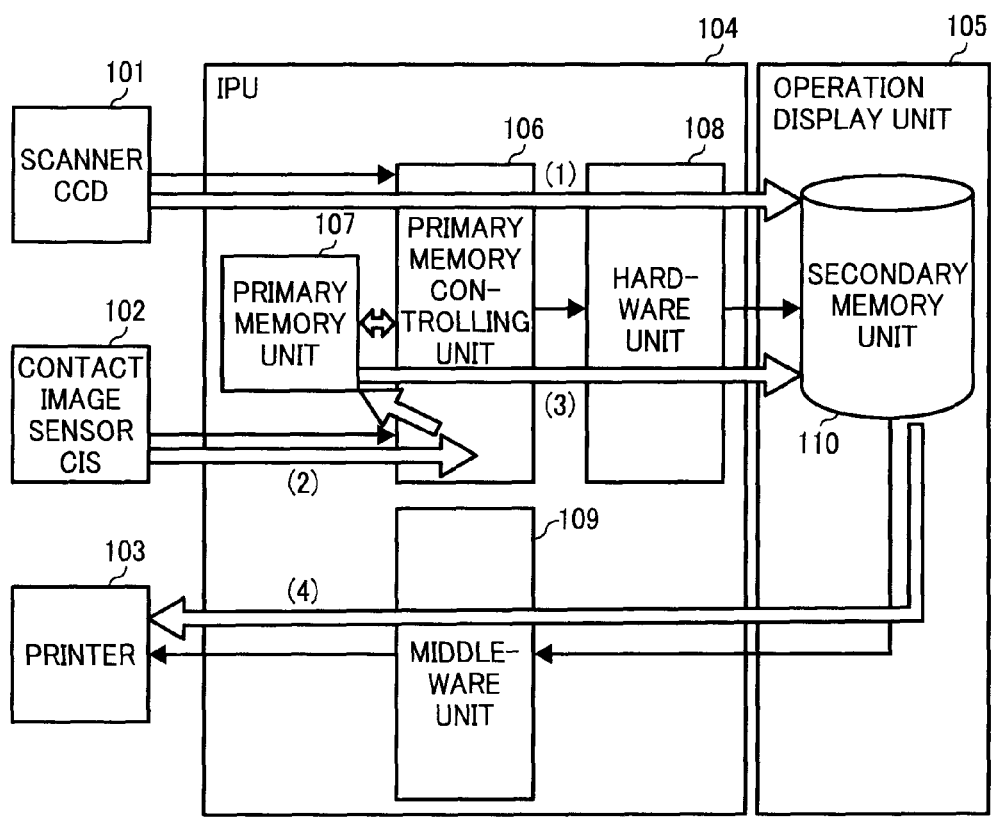
FIG. 4 is a schematic diagram for explaining a flow of image data in the MFP shown in FIG. 1.

FIG. 4 is a schematic diagram for explaining a flow of image data in the MFP 100. FIG. 5 is a table for explaining combinations of flows of image date when applications of the MFP 100 according to the embodiment are executed respectively. In the embodiment, as shown in FIG. 5, a copying, a scanning, a faxing (sending/receiving a facsimile), a document boxing (storing/printing a document), and a printing are example of the applications that can be executed by the MFP 100.

The flow of the image data when each application of the MFP 100 is executed is realized with the combination of four paths (1) to (4).

As shown in FIG. 5, the flow of the image data when a copying (one side) is executed is realized with the combination of the path (1) and the path (4). When the copying (one side) is executed, the hardware unit 108 receives image data from the scanner CCD 101 via the primary memory controlling unit 106 as in the path (1) shown in FIG. 4, performs image processing on the image data with the hardware unit 108, and then stores the processed image data into the secondary memory unit 110. Next, as in the path (4) shown in FIG. 4, the middleware unit 109 reads the processed image data from the secondary memory unit 110, performs image processing on the processed image data, and then inputs the image data into the printer 103 to get the image data printed.

The flow of the image data when a copying (both sides) is executed is realized with the combination of the paths (1) to (4). The processing executed in accordance with the path (1) and the path (4) shown in FIG. 4 is similar to that of when the copying (one side) is executed, and explanations thereof are omitted. When the copying (both sides) is executed, the primary memory controlling unit 106 receives image data from the contact image sensor CIS 102 and stores the image data into the primary memory unit 107 as in the path (2) shown in FIG. 4. In the embodiment, because the MFP 100 includes only the single hardware unit 108 that performs image processing on the read image data, the MFP 100 cannot perform processing on the image data read by the scanner CCD 101 and the image data read by the contact image sensor CIS 102 at the same time. Therefore, in the embodiment, the primary memory controlling unit 106 stores the image data read by the contact image sensor CIS 102 into the primary memory unit 107 until the completion of the image processing on the image data read by the scanner CCD 101 with the hardware unit 108.

When the image processing on the image data read by the scanner CCD 101 is completed, the MFP 100 reads the image data from the primary memory unit 107 with the primary memory controlling unit 106, and inputs the image data into the hardware unit 108, and performs image processing on the image data with the hardware unit 108, and then stores the image data into the secondary memory unit 110 as in the path (3) shown in FIG. 4. Next, the MFP 100 performs printing processing on the image data stored in the secondary memory unit 110 as in the path (4) in the same way as when the copying (one side) is performed.

The flow of the image data when a scanning (one side) is executed is realized with the path (1) as shown in FIG. 5. The processing executed in accordance with the path (1) shown in FIG. 4 is similar to that of when the copying is executed, and explanations thereof are omitted.

The flow of the image data when a scanning (both sides) is executed is realized with the paths (1) to (3) as shown in FIG. 5. The processing executed in accordance with the paths (1) to (3) shown in FIG. 4 is similar to that of when the copying is executed, and explanations thereof are omitted.

The flow of the image data when a fax sending (one side) is executed is realized with the path (1) as shown in FIG. 5. The processing executed in accordance with the path (1) shown in FIG. 4 is similar to that of when the copying is executed, and explanations thereof are omitted. After the processing in accordance with the path (1) shown in FIG. 4 is completed, the MFP 100 sends the image data read by the scanner CCD 101 and stored in the secondary memory unit 110 to a PC and a printer and the like connected with a network such as a local area network LAN.

The flow of the image data when a fax sending (both sides) is executed is realized with the paths (1) to (3) as shown in FIG. 5. The processing executed in accordance with the paths (1) to (3) shown in FIG. 4 is similar to that of when the copy is executed, and explanations thereof are omitted. The MFP 100 sends the image data read by the scanner CCD 101 and the contact image sensor CIS 102 and stored in the secondary memory unit 110 to the PC and the printer and the like connected with the network.

The flow of the image data when a fax receiving (one side) or a fax receiving (both sides) is executed is realized with the path (4) as shown in FIG. 5. The processing executed in accordance with the path (4) shown in FIG. 4 is almost similar to that of when the copying is executed, and explanations thereof are omitted. When the fax receiving (one side) or the fax receiving (both sides) is executed, the MFP 100 performs processing in accordance with the path (1) in FIG. 4 on image data received from the PC and the like connected with the network instead of the image data stored in the secondary memory unit 110.

The flow of the image data when a document box storing (one side) is executed is realized with the path (1) as shown in FIG. 5. The processing executed in accordance with the path (1) shown in FIG. 4 is similar to that of when the copying is executed, and explanations thereof are omitted.

The flow of the image data when a document box storing (both sides) is executed is realized with the paths (1) to (3) as shown in FIG. 5. The processing executed in accordance with the paths (1) to (3) shown in FIG. 4 is similar to that of when the copying is executed, and explanations thereof are omitted.

The flow of the image data when a document box printing (one side) or a document box printing (both sides) is executed is realized with the path (4) as shown in FIG. 5. The processing executed in accordance with the path (4) shown in FIG. 4 is similar to that of when the copying is executed, and explanations thereof are omitted.

The flow of the image data when a printing (one side) or a printing (both sides) is executed is realized with the path (4) as shown in FIG. 5. The processing executed in accordance with the path (4) shown in FIG. 4 is almost similar to that of when the copying is executed, and explanations thereof are omitted. When the printing (one side) or the printing (both sides) is executed, the MFP 100 performs processing in accordance with the path (4) in FIG. 4 on image data received from the PC and the like connected with the network instead of the image data stored in the secondary memory unit 110.

When the copying or the printing is executed, the MFP 100 can print a plurality of image data on a single paper sheet in a consolidate manner. In this case, the MFP 100 scales a plurality of image data stored in the secondary memory unit 110 or a plurality of image data received from the PC and the like connected with the network to make it fit on a single paper sheet, and inputs image data obtained by consolidating the image data that has been scaled to the middleware unit 109.

Figure 6:
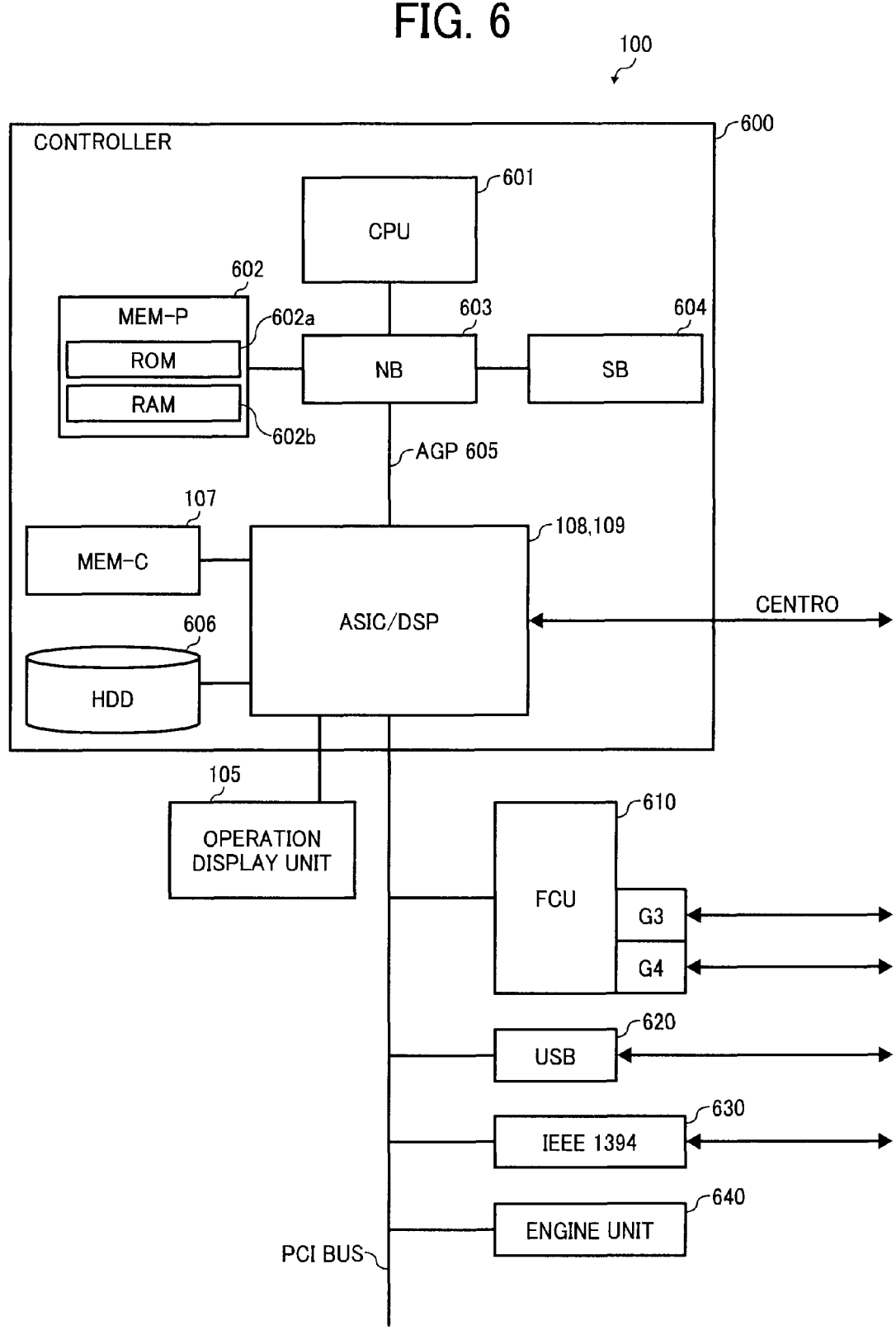
FIG. 6 is a block diagram of a hardware configuration of the MFP shown in FIG. 1.

FIG. 6 is a block diagram of a hardware configuration of the MFP 100. The MFP 100 includes a controller 600 and an engine unit (Engine) 640 connected to the controller 600 with a PCI (Peripheral Component Interconnect) bus. The controller 600 is a controller that controls the entire MFP 100, a plotting, communication, and an input from the operation display unit 105. In the embodiment, the controller 600 realizes the IPU 104. The engine unit 640 corresponds to the printer 103 and the like capable of connecting to the PCI bus, for example, a black and white plotter, a one drum color plotter, a four drum color plotter, the scanner CCD 101, and the contact image sensor CIS 102.

The controller 600 includes a CPU 601, a north bridge (NB) 603, a system memory (MEM-P) 602, a south bridge (SB) 604, a MEM-C (primary memory unit) 107, an ASIC (Application Specific Integrated Circuit)/DSP 108, 109, and a hard disk drive (HDD) 606. The north bridge (NB) 603 is connected to the ASIC (Application Specific Integrated Circuit)/DSP 108, 109 through an AGP (Accelerated Graphic Port) bus 605. The MEM-P 602 further includes a ROM (Read Only Memory) 602a, and a RAM (Random Access Memory) 602b.

The CPU 601 controls the entire MFP 100, and has a chip set including the NB 603, the MEP-P 602, and the SB 604, and is connected to another apparatus through the chip set.

The NB 603 is a bridge that is used for connecting the CPU 601 with the MEM-P 602, the SB 604, and the AGP 605. The NB 603 includes a memory controller that controls reading and writing of data from and in the MEM-P 602a and the like, a PCI master, and an AGP target.

The MEM-P 602 is a system memory used as a memory to store a computer program and data, a memory to develop the computer program and data, a plot memory for the printer, and the like. The MEM-P 602 includes the ROM 602a and the RAM 602b. The ROM 602a is a read only memory used as the memory to store the computer program and data, and the RAM 602b is a memory capable of writing and reading data used as the memory to develop the computer program and data, the plot memory for the printer, and the like.

The SB 604 is a bridge used for connecting the NB 603 with a PCI device and a peripheral device. The SB 604 is connected to the NB 603 through the PCI bus, and the PCI bus is also connected to a network interface (I/F) unit and the like.

The ASIC/DSP 108, 109 is an IC (Integrated Circuit) for image processing having hardware element for image processing, and has a role to connect the AGP 605, the PCI bus, the HDD 606, and the MEM-C 107 to each other. The ASIC/DSP 108, 109 includes a PCI target, an AGP master, an arbiter (ARB) that is central to the ASIC/DSP 108, 109, a memory controller that controls the MEM-C 107, a plurality of DMACs (Directed Memory Access Controller) that execute a rotation of image data and the like with hardware logic and the like, and a PCI unit that transfers data through the PCI bus to and from the engine unit 640. An FCU (Fax Control Unit) 610, a USB (Universal Serial Bus) 620, and an IEEE 1394 (the Institute of Electrical and Electronics Engineers 1394) interface 630 are connected to the ASIC/DSP 108, 109 through the PCI bus.

The MEM-C 107 is a local memory used for an image copy buffer and a code buffer, and the HDD (Hard Disk Drive) 606 is a storage unit to store image data, a computer program, a font data, and a form.

The AGP is a bus interface for a graphics accelerator card proposed to speed up a graphic processing, and speeds up the graphics accelerator card by directly accessing the MEM-P 602 with high throughput.

Moreover, the image processing program by the MFP 100 can be delivered or distributed, for example, in a state preinstalled in a recording medium such as a ROM.

The image processing program executed by the MFP 100 is provided in such a manner that the image processing program is stored, in a form of a file that is installable and executable on a computer, in a recording medium readable by the computer, such as a compact disk-read only memory (CD-ROM), a flexible disk (FD), a compact disk-recordable (CD-R), or a digital versatile disk (DVD).

Alternatively, the image processing program executed by the MFP 100 can be provided in such a manner that the image processing program is stored in another computer connected to the computer via a network such as the Internet, and downloaded to the computer via the network. The image processing program executed by the MFP 100 can be delivered or distributed via a network such as the Internet.

The operation display unit 105 is controlled by a different CPU (not shown) from the CPU 601. The operation display unit 105 includes a different memory from the MEM-P 602 and the MEM-C 107 as a memory for the different CPU. The different CPU performs developing processing on image data displayed on a LCD touch panel (not shown) and the like with a work area reserved in the different memory. As another modification, the MEM-P 602 and the MEM-C 107 can be used, and a work area for the LCD touch panel can be reserved as a different area from a work area for the CPU 601. The operation display unit 105 further includes a different storage (the secondary memory unit 110) from the HDD 606 as a memory that the different CPU uses. The different CPU stores the image data subjected to the image processing by the ASIC/DSP 108 with the different storage. As another modification, the HDD 606 can be used.

Figure 7:
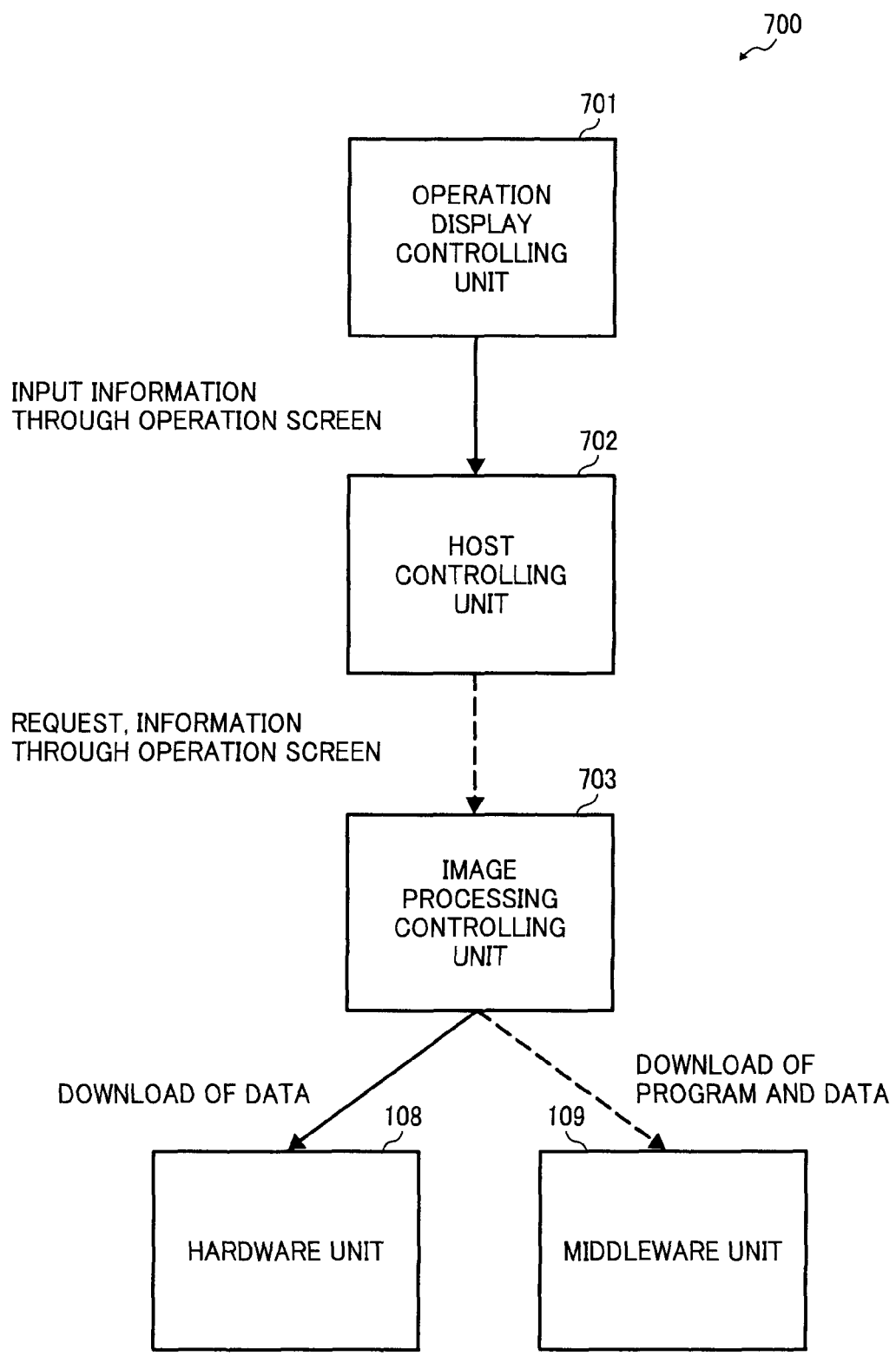
FIG. 7 is a block diagram for explaining a functional configuration of an image processing control system in the MFP shown in FIG. 1.

FIG. 7 is a block diagram for explaining a functional configuration of an image processing control system in the MFP 100. The CPU 601 and the CPU of the operation display unit 105 execute the image processing program stored in the ROM 602a and a computer program stored in the memory of the operation display unit 105, respectively, so that the image processing control system in the MFP is realized.

An image processing control system 700 includes an operation display controlling unit 701, a host controlling unit 702, and an image processing controlling unit 703. In the embodiment, the CPU 601 executes the image processing program stored in the ROM 602a, so that two controlling units are realized. One of the controlling units (the host controlling unit 702) controls storage of the image data into the primary memory unit 107 by the primary memory controlling unit 106, and input and output to/from the hardware unit 108 and the middleware unit 109, and the like. The other of the controlling units (the image processing controlling unit 703) controls the hardware unit 108 and the middleware unit 109, and inputs the image data to the hardware unit 108 and the middleware unit 109, and controls setting of image processing parameters before the image processing are started such that optimal image processing are performed in the hardware unit 108 and the middleware unit 109.

The CPU of the operation display unit 105 executes control software stored in the memory, so that the operation display controlling unit 701 is realized. The operation display controlling unit 701 controls the entire operation display unit 105. In the embodiment, the operation display controlling unit 701 receives information (hereinafter, "input information") set by a user through an operation screen of the operation display unit 105. The input information includes a variety of information about, for example, a color mode, a type of the application, a document mode, a scaling factor, a definition, the number of gradations, a notch (a print density on a document), a main scanning size X, a sub-scanning size Y.

The operation display controlling unit 701 stores the image data subjected to the image processing by the hardware unit 108 with information attached to the image data into the secondary memory unit 110.

The attached information includes reading-unit information indicating the scanner CCD 101 or the contact image sensor CIS 102, and the input information. The reading-unit information is information of when the image data is read, and includes at least one of reading-device information of the reading unit, document-side information of a document read by the reading unit, and reading-method information of the reading unit. In the embodiment, the attached information includes the input information received by the operation display controlling unit 701 in addition to the reading-unit information.

More specifically speaking, the reading-device information is information of a device such as the scanner CCD 101 and the contact image sensor CIS 102. The document-side information is information indicating whether the side of the document read by the reading unit is the front side thereof or the back side thereof. The reading-method information is information indicating a read method such as a document fix method in which a document fixed between a pressure plate and a contact glass is read (hereinafter "pressure plate") and a document transfer method in which a document fed to a read position is read (hereinafter "DF").

When the operation display controlling unit 701 inputs the image data to the printer 103 and performs printing processing on the image data on a paper sheet in accordance with the path (4) shown in FIG. 4, the operation display controlling unit 701 takes the image data and the attached information from the secondary memory unit 110, and sends the image data and the attached information to the host controlling unit 702.

Figure 8:
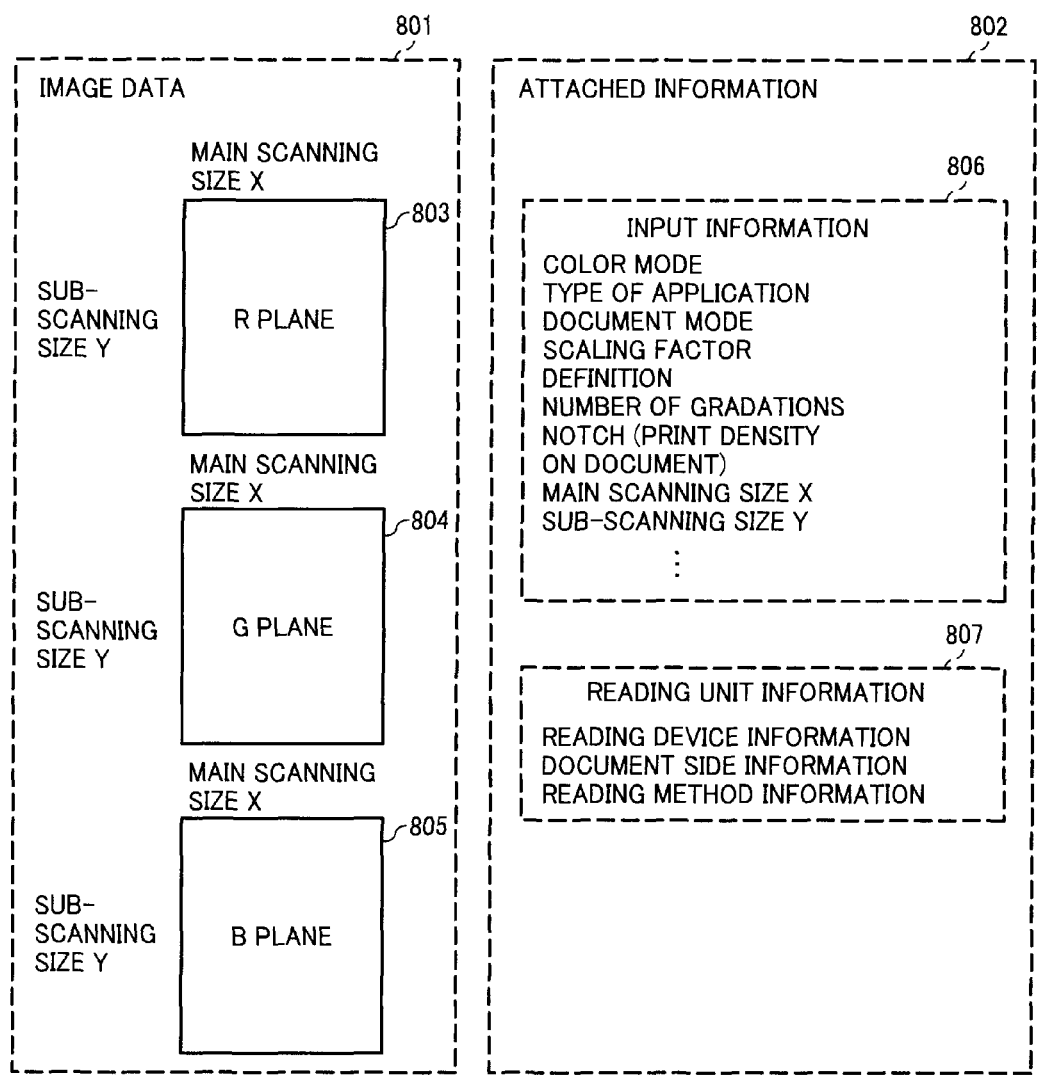
FIG. 8 is a block diagram for explaining configurations of image data and attached information taken from a secondary memory unit shown in FIG. 1.

FIG. 8 is a block diagram for explaining configurations of the image data and the attached information taken from the secondary memory unit 110. As shown in FIG. 8, the operation display controlling unit 701 takes the image data 801, and the attached information 802 including the input information 806 and the reading-unit information 807 from the secondary memory unit 110. In the embodiment, when the color mode indicated by the input information 806 included in the attached information 802 is color, the operation display controlling unit 701 takes the image data 801 in which image information 803 to 805 of RGB are arranged one dimensionally. The operation display controlling unit 701 takes the image information 803 to 805 that have the respective colors corresponding to the main scanning size X and the sub-scanning size Y indicated by the input information 806.

When the copying or the printing is executed such that a plurality of image data are printed on a single paper sheet in a consolidate manner, the operation display controlling unit 701 takes the plurality of image data and the attached information corresponding to the plurality of image data from the secondary memory unit 110. In this case, the operation display controlling unit 701 scales the plurality of image data in accordance with the number of pages in which the image information of the colors included in the image data is consolidated, and compresses an amount of the image data. The operation display controlling unit 701 creates image data in which the plurality of image data scaled are laid out in a single sheet, and sends the image data to the host controlling unit 702.

When the operation display controlling unit 701 prints the plurality of image data in a consolidate manner on a single paper sheet, the operation display controlling unit 701 newly creates the attached information (reading-unit information) of the image data created by the above mentioned processing based on the attached information taken together with the plurality of image data, and sends the created attached information to the host controlling unit 702. Each of FIGS. 9A to 9C is a schematic diagram for explaining creating operation of the reading-unit information when the image data is created in which first image data laid out in a single paper sheet and second image data laid out in a single paper sheet are laid out in a single paper sheet.

Figure 9A:
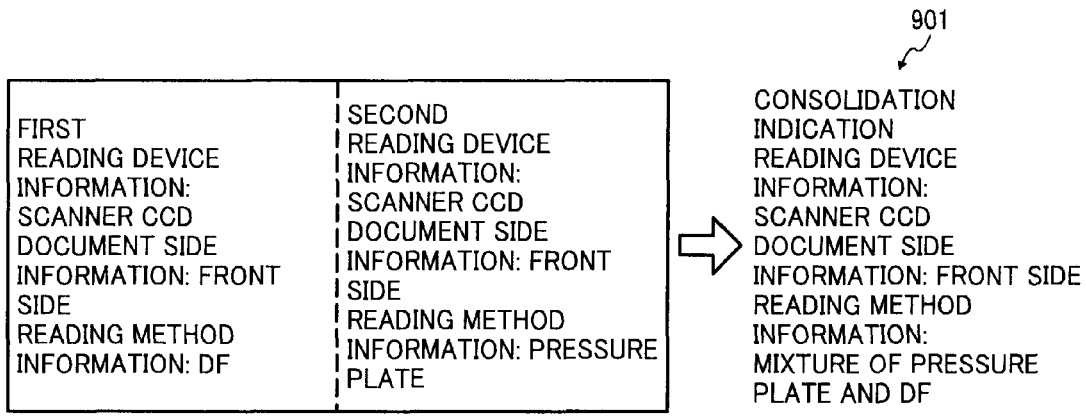
FIG. 9A is a schematic diagram for explaining generation of reading-unit information by the image forming apparatus shown in FIG. 1 when the image data is created in which first image data laid out in a single paper sheet and second image data laid out in a single paper sheet are laid out in a single paper sheet.

For example, as shown in FIG. 9A, when there is only difference between the reading method information of the first image data (DF) and the reading method information of the second image data (pressure plate), the reading-unit information 901 including the reading-device information (the scanner CCD), the document-side information (the front side), and the reading method information (a mixture of the pressure plate and the DF) is created.

Figure 9B:
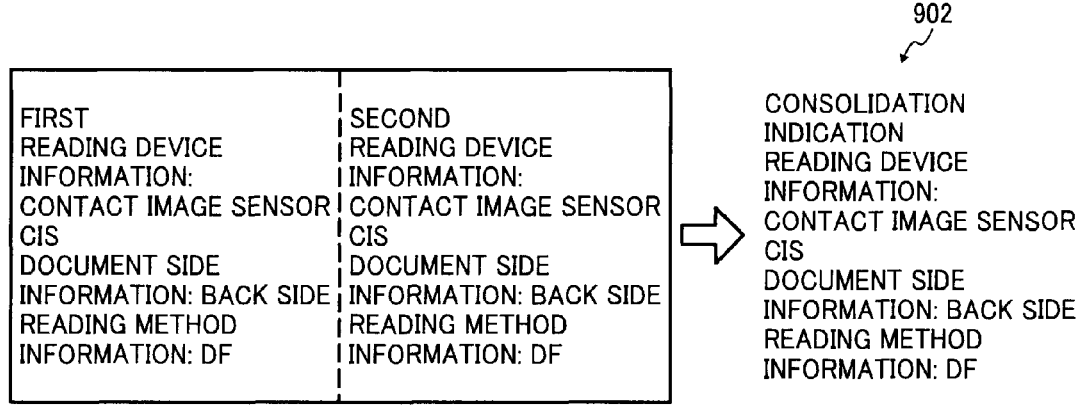
FIG. 9B is another schematic diagram for explaining generation of reading-unit information by the image forming apparatus shown in FIG. 1 when the image data is created in which first image data laid out in a single paper sheet and second image data laid out in a single paper sheet are laid out in a single paper sheet.

As shown in FIG. 9B, when the reading-unit information of the first image data is identical to the reading-unit information of the second image data, the reading-unit information 902 that is identical to both the reading-unit information of the first image data and the reading-unit information of the second image data is created.

Figure 9C:
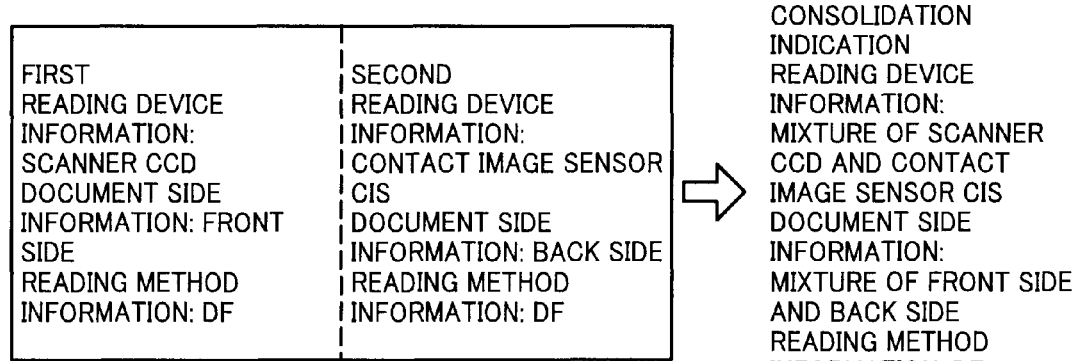
FIG. 9C is still another schematic diagram for explaining generation of reading-unit information by the image forming apparatus shown in FIG. 1 when the image data is created in which first image data laid out in a single paper sheet and second image data laid out in a single paper sheet are laid out in a single paper sheet.

As shown in FIG. 9C, when the reading-device information (the scanner CCD) and the document-side information (the front side) of the first image data are different from the reading-device information (the contact image sensor CIS) and the document-side information (the back side) of the second image data, respectively, the reading-unit information 903 including the reading-device information (a mixture of the scanner CCD and the contact image sensor CIS), the document-side information (a mixture of the front side and the back side), and the reading method information (DF) is created.

The host controlling unit 702 controls the timing when the image processing controlling unit 703 executes the processing. In the embodiment, the host controlling unit 702 divides the processing to be executed by the image processing controlling unit 703 into tasks in consideration of the input information received by the operation display controlling unit 701 and time when the input information is received, and transmits the tasks to the image processing controlling unit 703 as processes. More specifically speaking, the host controlling unit 702 transmits to the image processing controlling unit 703 a scan process in which the image data read by the scanner CCD 101 and the contact image sensor CIS 102 are subjected to the image processing, and a plotter process in which the image data printed by the printer 103 on a paper sheet is subjected to the image processing. The host controlling unit 702 sends the image data read by the scanner CCD 101 and the contact image sensor CIS 102 to the hardware unit 108 through the image processing controlling unit 703, and causes the hardware unit 108 to perform image processing on the image data. The host controlling unit 702 sends the image data taken by the operation display controlling unit 701 to the middleware unit 109 through the image processing controlling unit 703, and causes the middleware unit 109 to perform image processing on the image data. The host controlling unit 702 further sends to the image processing controlling unit 703 the attached information taken together with the image data by the operation display controlling unit 701.

When a plurality of image data are printed on a single paper sheet in a consolidate manner, the host controlling unit 702 sends the image data created by the operation display controlling unit 701 to the middleware unit 109 through the image processing controlling unit 703, and causes the middleware unit 109 to perform image processing on the image data, and further sends the attached information created by the operation display controlling unit 701 to the image processing controlling unit 703.

Figure 10A:
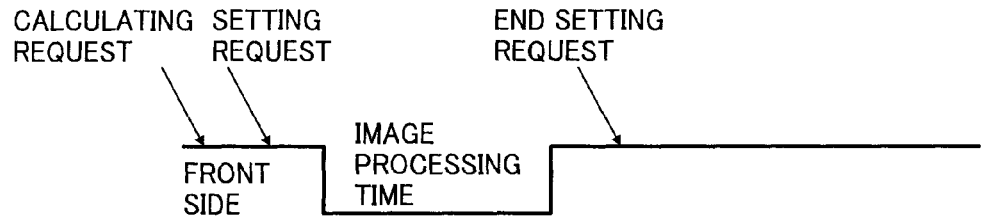
FIG. 10A is a timing chart when a host controlling unit transmits a scan process in which a scanner CCD reads image data of a front side of a document to an image processing controlling unit shown in FIG. 1.
Figure 10B:
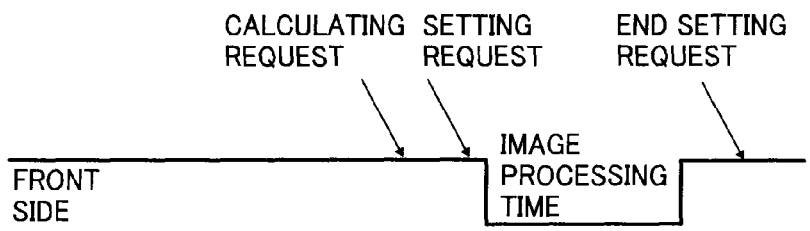
FIG. 10B is a timing chart when the host controlling unit transmits a scan process in which a contact image sensor CIS reads image data of a back side of a document to the image processing controlling unit shown in FIG. 1.
Figure 10C:
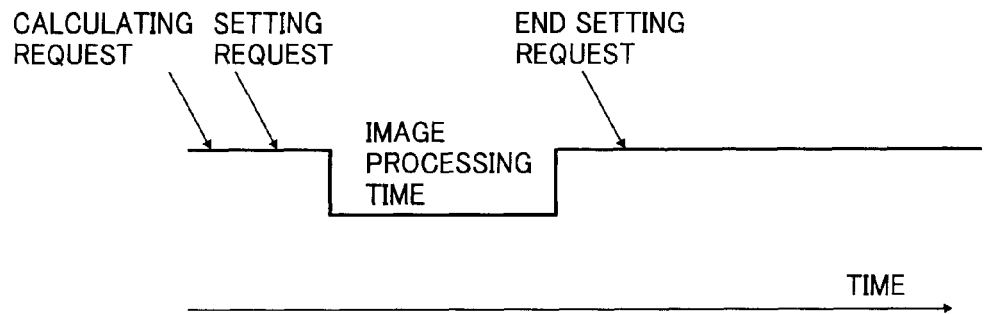
FIG. 10C is a timing chart when the host controlling unit transmits a plotter process in which a printer prints image data stored in the secondary memory unit on a paper sheet to the image processing controlling unit shown in FIG. 1.

FIGS. 10A to 10C are timing charts when the host controlling unit transmits processes to the image processing controlling unit. In the embodiment, as shown in FIGS. 10A to 10C, the host controlling unit 702 transmits to the image processing controlling unit 703 processes including a calculating request that requests calculating and holding the image processing parameter, and a setting request that requests setting the image processing parameter to the hardware unit 108 or the middleware unit 109, and an end setting request that requests performing a post-processing of the held image processing parameter (for example, a processing to prevent a memory leak such as opening of the held image processing parameter) as a unit.

For example, when the scan process in which the scanner CCD 101 reads image data of the front side of a document is transmitted to the image processing controlling unit 703 (shown in FIG. 10A), the host controlling unit 702 first sends the calculating request and the setting request to the image processing controlling unit 703 before the image processing by the hardware unit 108 is started, and allows the hardware unit 108 to perform image processing. Next, the host controlling unit 702 sends the image data read by the scanner CCD 101 to the hardware unit 108 through the image processing controlling unit 703, and causes the hardware unit 108 to perform image processing on the image data. When the image processing is completed, the host controlling unit 702 sends the end setting request to the image processing controlling unit 703, and causes the image processing controlling unit 703 to complete the scan process.

In the embodiment, the MFP 100 processes the image data read by the scanner CCD 101 and the image data read by the contact image sensor CIS 102 in the same image processing device (the hardware unit 108). Therefore, when the scan process in which the contact image sensor CIS 102 reads image data of the back side of the document is transmitted to the image processing controlling unit 703 (shown in FIG. 10B), the host controlling unit 702 executes the scan process in which the image data obtained by reading the back side of the document is subjected to the image processing in the same way as when the scan process in which the image data obtained by reading the front side of the document is subjected to the image processing is executed after the scan process regarding the image data of the front side of the document is completed. The host controlling unit 702 stores the image data read by the contact image sensor CIS 102 in the primary memory unit 107 until the image processing by the hardware unit 108 on the image data read by the scanner CCD 101 is completed, and reads the image data from the primary memory unit 107 after the image processing on the image data read by the scanner CCD 101 is completed, and inputs the image data to the hardware unit 108, and causes the hardware unit 108 to perform image processing on the image data. Therefore, when the application in which both sides of the document are read (for example, the copying (both sides)) is executed, a call timing of the scan process shown in FIG. 10A is different from a call timing of the scan process shown in FIG. 10B.

When the plotter process in which the printer 103 prints the image data stored in the secondary memory unit 110 on a paper sheet is transmitted to the image processing controlling unit 703 (shown in FIG. 10C), the host controlling unit 702 first sends the calculating request and the setting request to the image processing controlling unit 703 before the image processing by the middleware unit 109 is started, and allows the middleware unit 109 to perform image processing. When the host controlling unit 702 sends the calculating request to the image processing controlling unit 703, the host controlling unit 702 sends to the image processing controlling unit 703 together with the calculating request the attached information taken together with the image data by the operation display controlling unit 701. Next, the host controlling unit 702 sends the image data taken by the operation display controlling unit 701 to the middleware unit 109 through the image processing controlling unit 703, and causes the middleware unit 109 to perform image processing. After that, when the image processing is completed, the host controlling unit 702 sends the end setting request to the image processing controlling unit 703, and causes the image processing controlling unit 703 to complete the plotter process. In the embodiment, the MFP 100 executes the image processing of the scan process and the image processing of the plotter process by image processing devices different from each other (the hardware unit 108 and the middleware unit 109), respectively. Therefore, as shown in FIGS. 10A and 10C, the call timing when the scan process is transmitted to the image processing controlling unit 703 can be overlapped with the call timing when the plotter process is transmitted to the image processing controlling unit 703.

When the image processing controlling unit 703 receives the calculating request included in the scan process from the host controlling unit 702, the image processing controlling unit 703 calculates the image processing parameter to reduce an image quality difference between the image data that have been read by the scanner CCD 101 and the contact image sensor CIS 102 depending on the read characteristic of the scanner CCD 101 or the contact image sensor CIS 102 that has read the image data, and holds the calculated image processing parameter in the RAM 602b. Next, when the image processing controlling unit 703 receives the setting request included in the scan process from the host controlling unit 702, the image processing controlling unit 703 requests the hardware unit 108 to set the image processing parameter held in the RAM 602b. In the embodiment, the image processing controlling unit 703 controls setting of the calculated image processing parameter by downloading the data to the hardware unit 108. When the image processing controlling unit 703 receives the end setting request included in the scan process from the host controlling unit 702, the image processing controlling unit 703 performs the post-processing of the image processing parameter held in the RAM 602b. A method for calculating an image processing parameter to reduce an image quality difference between the image data that have been read by a plurality of reading units depending on the read characteristic of a reading unit is a known technology, and explanation thereof is omitted.

When the image processing controlling unit 703 receives the calculating request included in the plotter process from the host controlling unit 702, the image processing controlling unit 703 calculates the image processing parameter to reduce an image quality difference between the image data that have been read by the scanner CCD 101 and the contact image sensor CIS 102 depending on the read characteristic of the reading unit indicated by the attached information (the reading-unit information) received together with the calculating request and the writing characteristic of the printer 103, and holds the calculated image processing parameter in the RAM 602b. Next, when the image processing controlling unit 703 receives the setting request included in the plotter process from the host controlling unit 702, the image processing controlling unit 703 requests the middleware unit 109 to set the image processing parameter held in the RAM 602b. In the embodiment, the image processing controlling unit 703 controls setting of the calculated image processing parameter by downloading the computer program and the data to the middleware unit 109. When the image processing controlling unit 703 receives the end setting request included in the plotter process from the host controlling unit 702, the image processing controlling unit 703 performs the post-processing of the image processing parameter held in the RAM 602b.

An example of process of calculating the image processing parameter set in the middleware unit 109 by the image processing controlling unit 703 is explained below. In the embodiment, because the middleware unit 109 performs gamma correction processing and gradation conversion processing on the image data, a process of calculating the image processing parameter used in the adaptive gamma processing unit 301 and the gradation processing unit 302 is explained.

Figure 11:
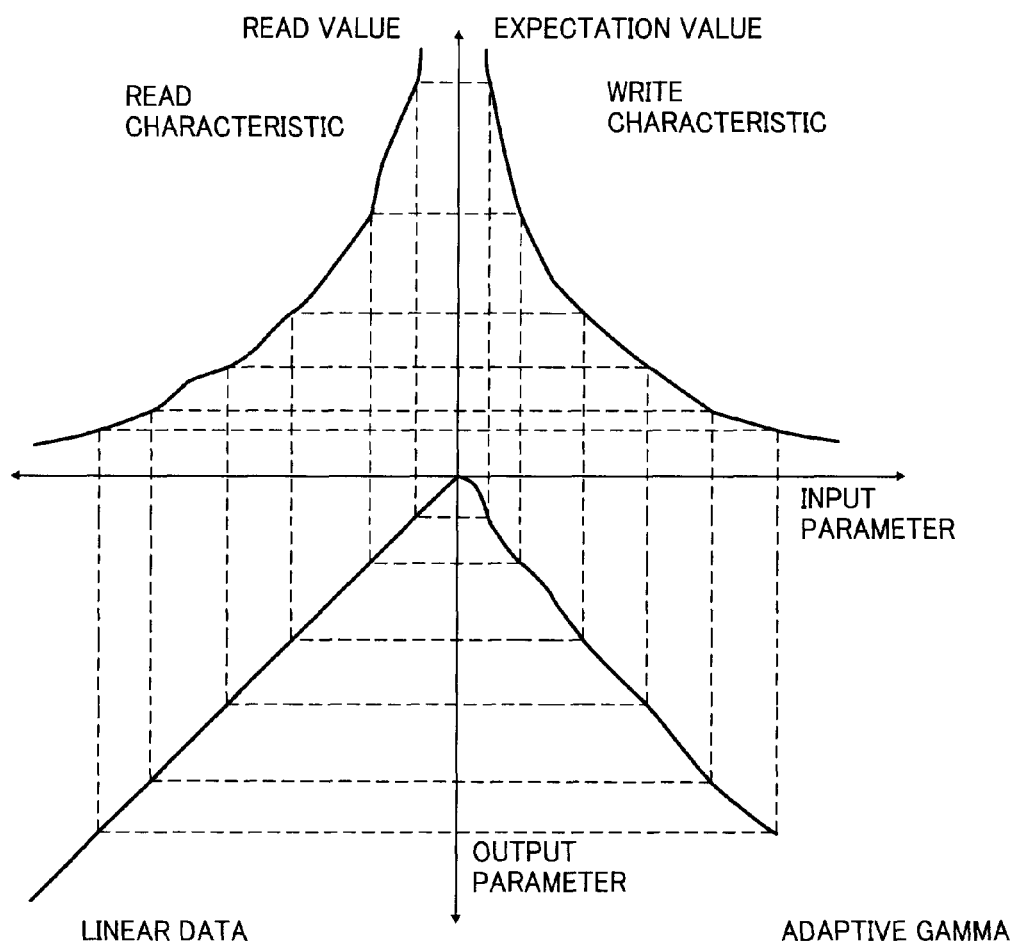
FIG. 11 is a diagram for explaining calculation of a gamma curve (an image processing parameter) used in the adaptive gamma processing in the middleware unit and a calculation result thereof.

The image processing controlling unit 703 calculates the image processing parameter of the adaptive gamma processing. FIG. 11 is a diagram for explaining calculation of a gamma curve (the image processing parameter) used in the adaptive gamma processing in the middleware unit 109 and a calculation result thereof according to the first embodiment of the present invention.

Data shown in the upper left portion of FIG. 11 is a read value indicating a read characteristic of a reading unit that is obtained when a predetermined image is read. In the embodiment, the read values of the scanner CCD 101 and the contact image sensor CIS 102 are stored in the ROM 602a in advance. The image processing controlling unit 703 acquires from the ROM 602a the read value of the reading unit indicated by the attached information (the reading-unit information) received together with the calculating request from the host controlling unit 702. In the embodiment, sampled digital data are used for the acquired read value and an expectation value indicating the writing characteristic of the printer 103 described below. Therefore, the image processing controlling unit 703 calculates the read value and the expectation value respectively shown in the upper left portion and the upper right portion of FIG. 11 by interpolating between the sampled data using a spline interpolation.

Data shown in the upper right portion of FIG. 11 is the expectation value indicating the writing characteristic of the printer 103. In the embodiment, the expectation value indicating the writing characteristic of the printer 103 is stored in the ROM 602a in advance, and the image processing controlling unit 703 acquires the expectation value indicating the writing characteristic of the printer 103 from the ROM 602a. In the embodiment, the expectation value indicating the writing characteristic of the printer 103 is stored in the ROM 602a, but the present invention is not limited to the above embodiment. For example, directly from the printer of the output destination, the expectation value indicating the writing characteristic of the printer can be acquired. Data shown in the lower left portion of FIG. 11 is preset linear data.

In the embodiment, the image processing controlling unit 703 calculates a gamma curve uniquely determined by the read value indicating the read characteristic of the reading unit shown in the upper left portion of FIG. 11, the expectation value indicating the writing characteristic of the printer 103 shown in the upper right portion of FIG. 11, and the linear data as the image processing parameter set in the middleware unit 109.

When the image processing controlling unit 703 prints the image data in which a plurality of the image data read by the scanner CCD 101 and the contact image sensor CIS 102 are consolidated on a paper sheet, the image processing controlling unit 703 calculates the image processing parameter from an intermediate value between the read value indicating the read characteristic of the scanner CCD 101 and the read value indicating the read characteristic of the contact image sensor CIS 102, and the expectation value indicating the writing characteristic of the printer 103. In the embodiment, when the attached information (the reading-unit information) received together with the calculating request from the host controlling unit 702 includes at least one of the reading-device information (the mixture of the scanner CCD and the contact image sensor CIS), the document-side information (the mixture of the front side and the back side), and the reading method information (the mixture of the pressure plate and the DF), the image processing controlling unit 703 calculates the gamma curve uniquely determined by the intermediate value between the read value indicating the read characteristic of the scanner CCD 101 and the read value indicating the read characteristic of the contact image sensor CIS 102, the expectation value indicating the writing characteristic of the printer 103, and the linear data as the image processing parameter set in the middleware unit 109. Thus, because the image processing parameter in which both the read characteristic of the plurality of the reading units and the writing characteristic of the printer 103 are reflected can be calculated, the consolidated image data with the same image quality can be output.

The image processing controlling unit 703 calculates the image processing parameter for gradation processing. Each of FIGS. 12A to 12C is an example of weighting table (the image processing parameter) that is used for the error diffusion operation of the gradation processing in the middleware unit. A known technology is used for the error diffusion operation, and explanation thereof is omitted.

FIG. 12A is an example of the weighting table for the scanner CCD that is used for the image processing of the image data read by the scanner CCD 101. FIG. 12B is an example of the weighting table for the contact image sensor CIS that is used for the image processing of the image data read by the contact image sensor CIS 102. FIG. 12C is an example of the weighting table for the mixture of the scanner CCD and the contact image sensor CIS that is used for the image processing of the image data including the image read by the scanner CCD 101 and the image read by the contact image sensor CIS 102. The image processing controlling unit 703 calculates the weighting table (the image processing parameter) for the reading unit that has read the image data subjected to gradation processing based on the reading unit indicated by the attached information (the reading-unit information) received together with the calculating request from the host controlling unit 702.

Figure 13A:
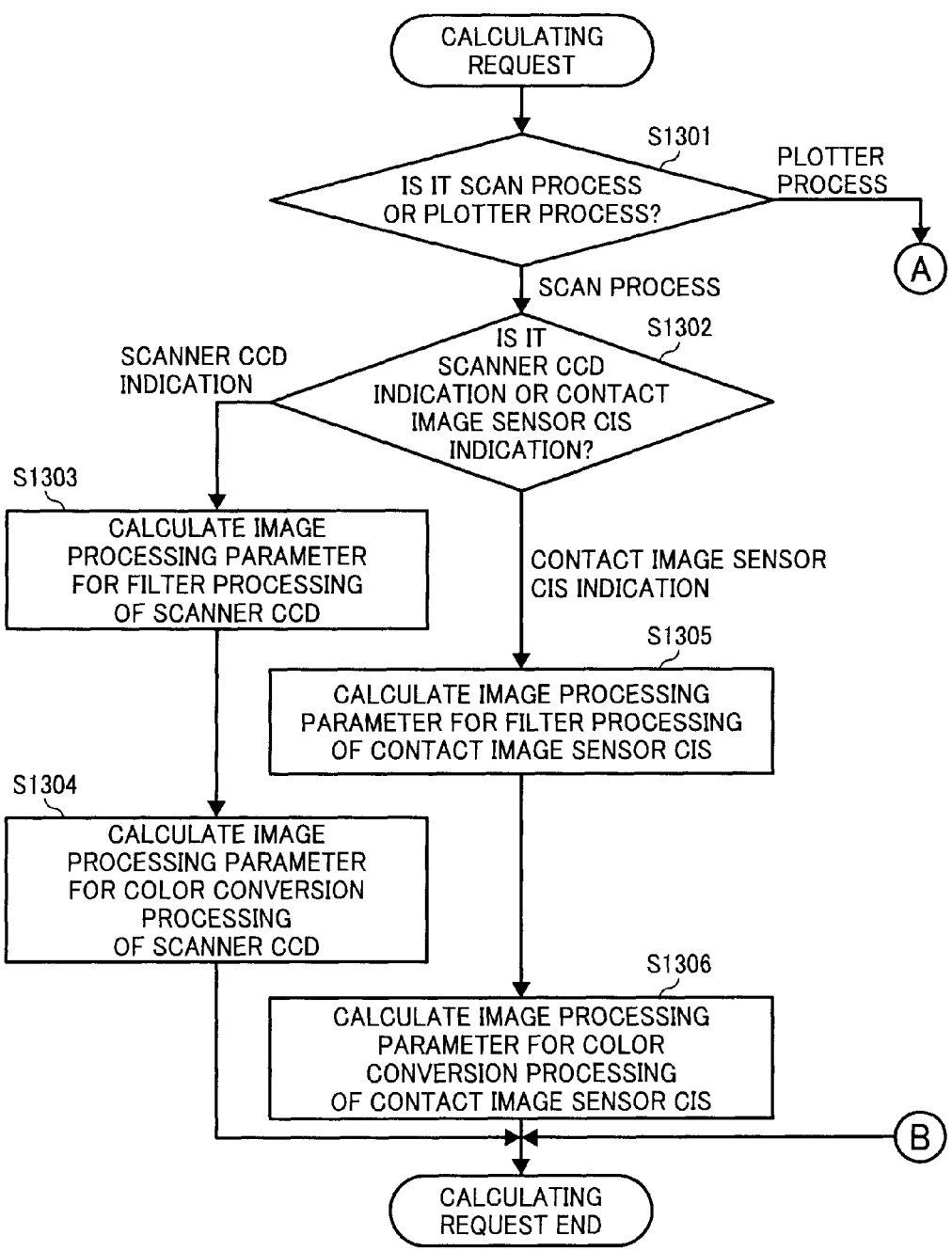
FIGS. 13A and 13B are flowcharts of operation performed by the image processing controlling unit shown in FIG. 1 when calculating the image processing parameter.
Figure 13B:
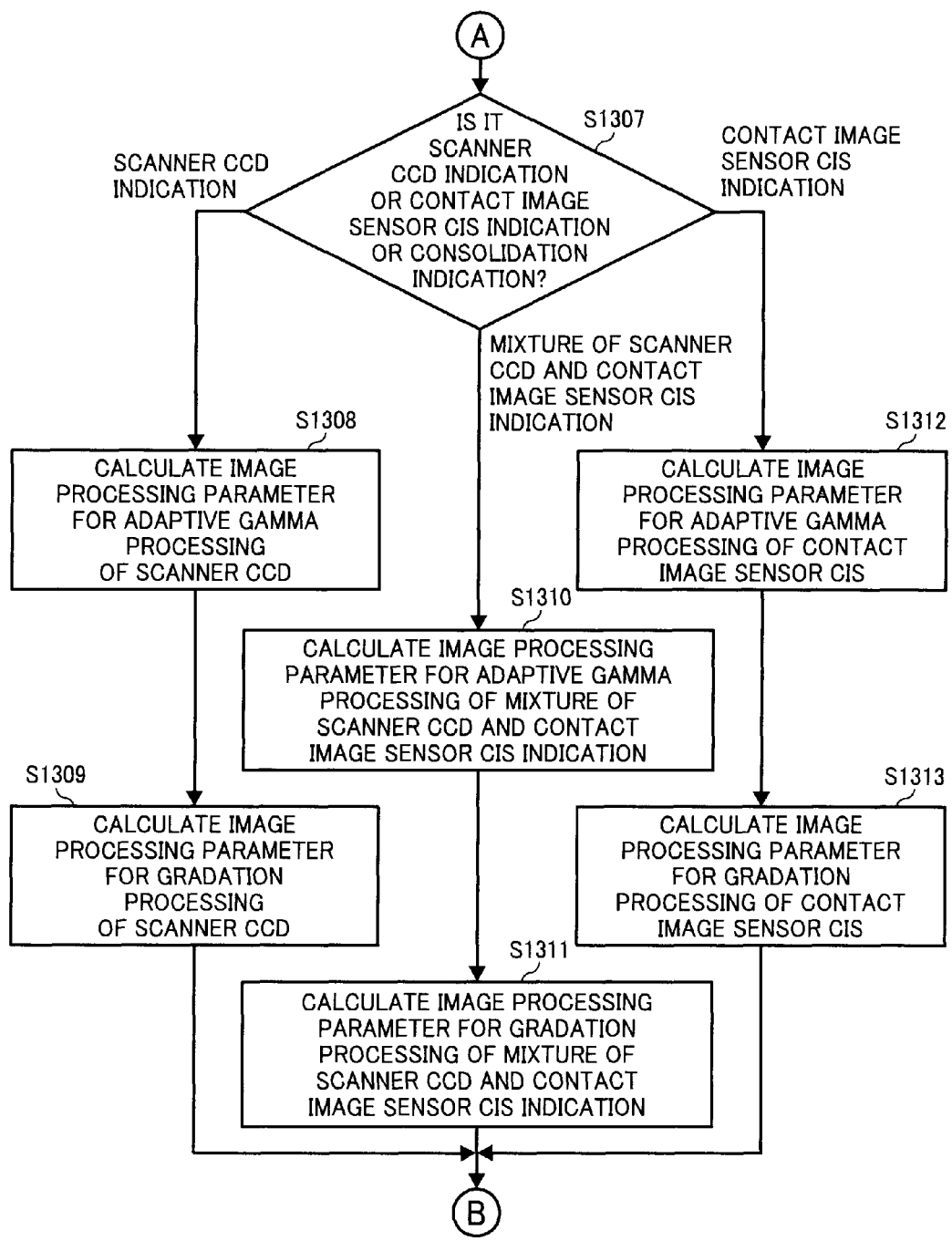

FIGS. 13A and 13B are flowcharts of operation performed by the image processing controlling unit 703 when calculating the image processing parameter.

First, when the image processing controlling unit 703 receives the calculating request from the host controlling unit 702, the image processing controlling unit 703 judges whether the received calculating request is for the scan process or for the plotter process (Step S1301). When the received calculating request is for the scan process, the image processing controlling unit 703 judges whether the reading unit that has read the image data is the scanner CCD 101 or the contact image sensor CIS 102 (Step S1302).

When the reading unit is the scanner CCD 101 (Step S1302: the scanner CCD indication), the image processing controlling unit 703 calculates the image processing parameter for the filter processing and the image processing parameter for the color conversion processing depending on the read characteristic of the scanner CCD 101 (Step S1303, Step S1304).

On the other hand, when the reading unit is the contact image sensor CIS 102 (Step S1302: the contact image sensor CIS indication), the image processing controlling unit 703 calculates the image processing parameter for the filter processing and the image processing parameter for the color conversion processing depending on the read characteristic of the contact image sensor CIS 102 (Step S1305, Step S1306).

When the received calculating request is for the plotter process (Step S1301: the plotter process), the image processing controlling unit 703 judges whether the reading unit indicated by the reading-unit information (for example, the document-side information) included in the attached information received together with the calculating request from the host controlling unit 702 is the scanner CCD 101, the contact image sensor CIS 102, or a consolidation indication (Step S1307). In the embodiment, the image processing controlling unit 703 judges it is the consolidated print when the document-side information indicates the mixture of the front side and the back side.

When the reading unit indicated by the document-side information is the scanner CCD 101 (Step S1307: the scanner CCD indication), the image processing controlling unit 703 calculates the image processing parameter for the adaptive gamma processing and the image processing parameter for the gradation processing by using the read value indicating the read characteristic of the scanner CCD 101 and the expectation value indicating the writing characteristic of the printer 103 (Step S1308, Step S1309).

On the other hand, when the consolidated print is indicated by the document-side information (Step S1307: the mixture of the scanner CCD and the contact image sensor CIS indication), the image processing controlling unit 703 calculates the image processing parameter for the adaptive gamma processing and the image processing parameter for the gradation processing by using the intermediate value between the read value indicating the read characteristic of the scanner CCD 101 and the read value indicating the read characteristic of the contact image sensor CIS 102 and the expectation value indicating the writing characteristic of the printer 103 (Step S1310, Step S1311).

When the reading unit indicated by the document-side information is the contact image sensor CIS 102 (Step S1307: the contact image sensor CIS indication), the image processing controlling unit 703 calculates the image processing parameter for the adaptive gamma processing and the image processing parameter for the gradation processing by using the read value indicating the read characteristic of the contact image sensor CIS 102 and the expectation value indicating the writing characteristic of the printer 103 (Step S1312, Step S1313).

As described above, in the middleware unit 109 that performs image processing in accordance with the writing characteristic of the printer 103 that prints the image data on a paper sheet of the MFP 100 according to the embodiment, because the processing to correct the difference of the reading characteristics between the plurality of the reading units can be performed, the image quality difference between the printed images of the image data that have been read by the reading units that have the reading characteristics different from each other can be reduced. In the MFP 100, because the reading-unit information as well as the image data is stored in the secondary memory unit 110, even if the image data stored in the secondary memory unit 110 is reprinted after some time has elapsed, it is possible to reduce the image quality difference between the printed images of the image data that have been read by the reading units that have the reading characteristics different from each other.

An MFP according to a second embodiment of the present invention executes a setting process for an image processing parameter when image data obtained by reading a back side of a document is subjected to an image processing by using an image processing parameter set in an image processing device when image data obtained by reading a front side of the document is subjected to the image processing. Thus, processing time needed for setting the image processing parameter is shortened, and processing of software needed for the setting process for the image processing parameter is reduced. The configuration of the MFP, and function configurations realized by an operation display controlling unit, a host controlling unit, and an image processing controlling unit are almost the same as those of the first embodiment of the present invention, and only processing different from those of the first embodiment is explained. In the following explanations, a setting process for an image processing parameter in a plotter process for the image data obtained by reading the back side of the document is explained. A setting process for an image processing parameter in a scan process for the image data obtained by reading the back side of the document is similar to the setting process for the image processing parameter in the plotter process for the image data obtained by reading the back side of the document.

As described in the first embodiment, the MFP 100 according to the second embodiment processes the image data read by the scanner CCD 101 and the image data read by the contact image sensor CIS 102 by the same image processing device (the hardware unit 108). Therefore, when the scan process in which the image data obtained by reading the back side of the document by the contact image sensor CIS 102 is subjected to the image processing is transmitted to the image processing controlling unit 703, the host controlling unit 702 executes the scan process in which the image data obtained by reading the back side of the document is subjected to the image processing in a manner similar to the scan process in which the image data obtained by reading the front side of the document is subjected to the image processing after the scan process in which the image data obtained by reading the front side of the document is subjected to the image processing is completed.

When the image processing controlling unit 703 received the calculating request included in the scan process (or the plotter process) of the image data that has been read by the contact image sensor CIS 102 from the host controlling unit 702 in the case where, for example, the copying (both sides) is executed, the image processing controlling unit 703 calculates only the image processing parameter different from the image processing parameter used in the scan process (or the plotter process) of the image data that has been read by the scanner CCD 101. When the image processing controlling unit 703 received the setting request included in the scan process (or the plotter process) of the image data that has been read by the contact image sensor CIS 102 from the host controlling unit 702, the image processing controlling unit 703 only requests the hardware unit 108 (or the middleware unit 109) to reset the calculated image processing parameter.

In the embodiment, the image processing controlling unit 703 segments an image processing module included in an image processing device (for example, the middleware unit 109) by control units, and controls the image processing in the image processing device. More specifically speaking, when the image processing controlling unit 703 receives the calculating request from the host controlling unit 702, the image processing controlling unit 703 calculates and holds the image processing parameter set in the adaptive gamma processing unit 301 by using index numbers of the image processing parameters classified by controlling factors that can switch the image processing parameters set in the adaptive gamma processing unit 301. This can be applied to not only the adaptive gamma processing unit 301 but also other image processing modules. When the image processing controlling unit 703 receives the setting request from the host controlling unit 702, the image processing controlling unit 703 downloads into the middleware unit 109 for each of the image processing parameters classified by the index numbers a computer program and data stored in the ROM 602*a* in association with the image processing parameter. Thus, the index number is a setting unit of the image processing parameter set in the image processing module and a processing unit within the image processing module that performs image processing with using the set image processing parameter.

FIG. 14 is examples of the calculation results of the image processing parameters classified by the controlling factors according to the second embodiment of the present invention. In the embodiment, the image processing controlling unit 703 calculates the image processing parameters of the index numbers 1 to 4. For example, the image processing parameter of the index number 1 is the parameter switched depending on the type of the application included in the input information. The image processing parameter of the index number 2 is the parameter switched depending on the image quality mode included in the input information. The image processing parameter of the index number 3 is the parameter switched depending on the type of the application included in the input information and the reading-device information included in the reading-unit information. The image processing parameter of the index number 4 is the parameter switched depending on the color mode included in the input information and the reading-device information included in the reading-unit information.

Figure 15A:
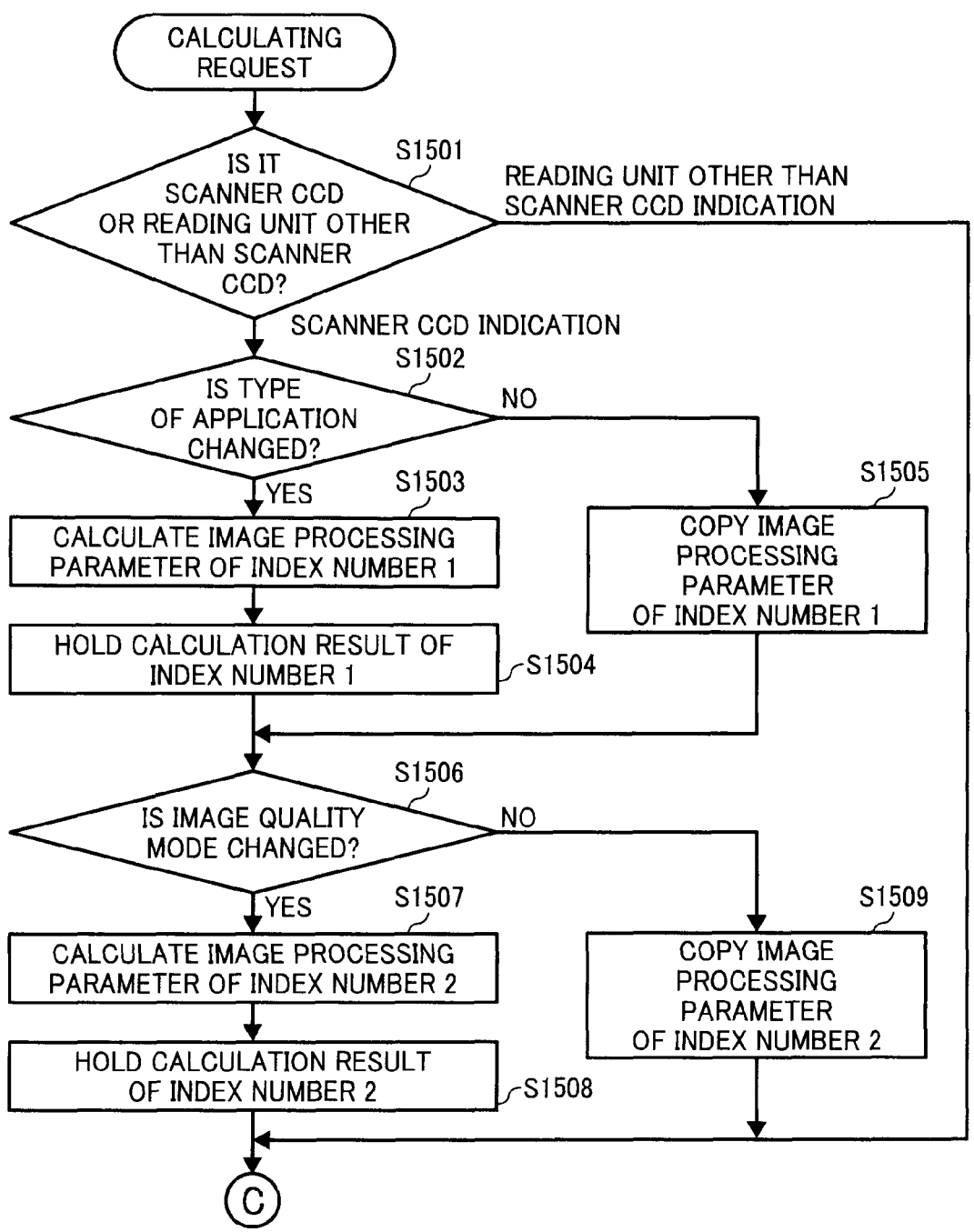
FIGS. 15A and 15B are flowcharts of operation performed by the image processing controlling unit for calculating the image processing parameter set in an adaptive gamma processing unit of a middleware unit according to the second embodiment.
Figure 15B:
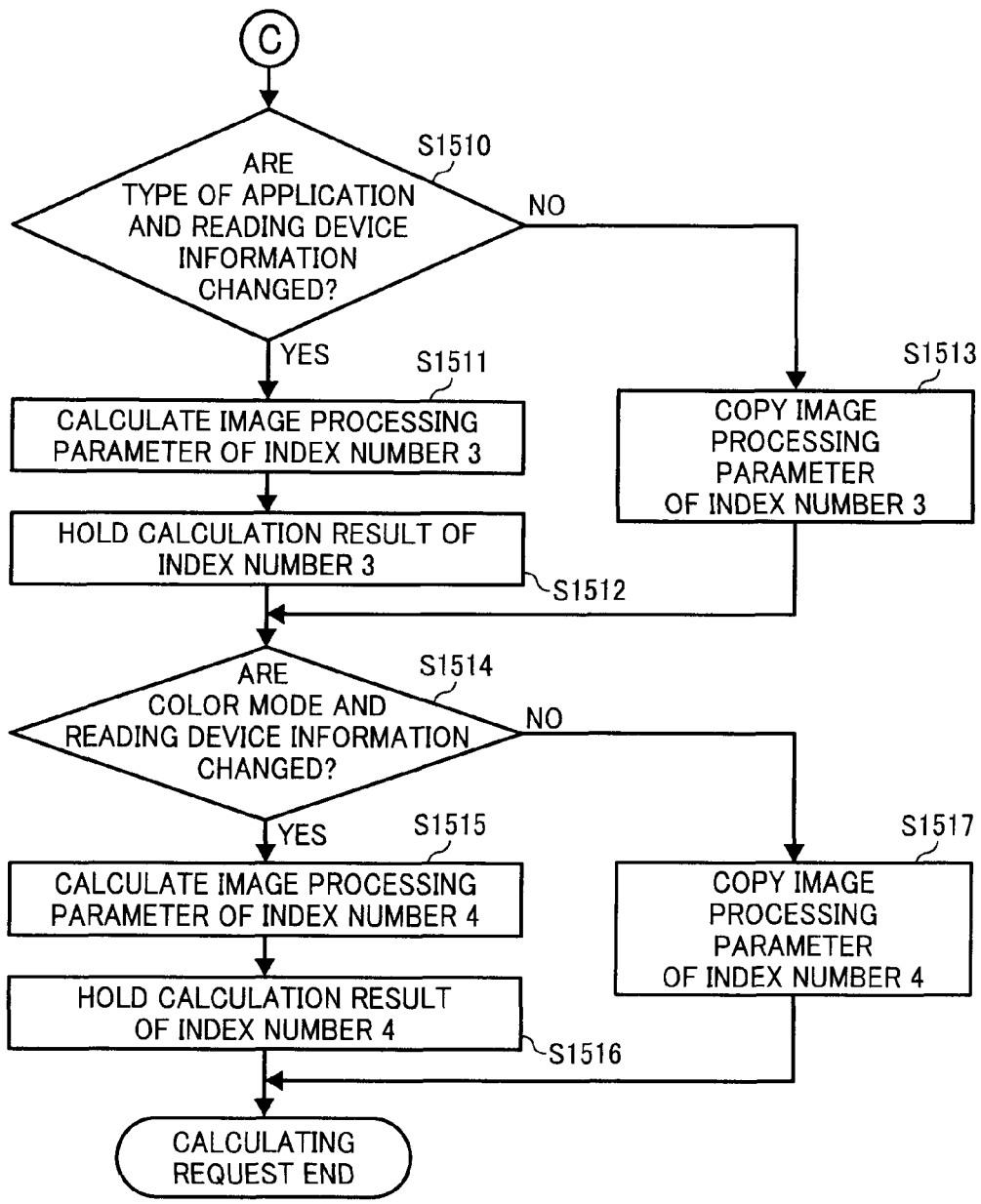

FIGS. 15A and 15B are flowcharts of operation performed by the image processing controlling unit 703 when calculating the image processing parameter set in the adaptive gamma processing unit 301 of the middleware unit 109 according to the second embodiment of the present invention. In the embodiment, the image processing controlling unit 703 stores in the RAM 602*b* the calculation result of the image processing parameter of the index number corresponding to at least the last calculating request, and the controlling factor that has switched the image processing parameter of the index number corresponding to at least the last calculating request. In the embodiment, an example in which the image processing parameter set in the adaptive gamma processing unit 301 of the middleware unit 109 is calculated is explained. Each of the image processing parameters of the hardware unit 108 and another image processing module of the middleware unit 109 is calculated in the same way as when the image processing parameter set in the adaptive gamma processing unit 301 of the middleware unit 109 is calculated.

First, when the image processing controlling unit 703 receives the calculating request included in the plotter process from the host controlling unit 702, the image processing controlling unit 703 judges whether the reading unit indicated by the reading-unit information (for example, the reading-device information) included in the attached information received together with the calculating request is the scanner CCD 101 or the reading unit other than the scanner CCD 101 (Step S1501). When the reading unit indicated by the reading-unit information is the scanner CCD 101 (Step S1501: the scanner CCD), the image processing controlling unit 703 compares the type of the application that has switched the image processing parameter of the index number 1 by the last calculating request with the type of the application included in the input information, and judges whether the type of the application is changed (Step S1502).

When the type of the application is changed (Step S1502: Yes), the image processing controlling unit 703 calculates the image processing parameter of the index number 1, and holds the calculated image processing parameter (Step S1503, Step S1504). Further, the image processing controlling unit 703 updates the image processing parameter of the index number 1 stored in the RAM 602*b* with the calculated image processing parameter. On the other hand, when the type of the application is not changed (Step S1502: No), the image processing controlling unit 703 copies the image processing parameter of the index number 1 stored in the RAM 602*b* (Step S1505).

More specifically speaking, the image processing controlling unit 703 holds the image processing parameter of the index number 1 stored in the RAM 602*b* as the calculated image processing parameter.

When the image processing parameter of the index number 1 is held (Step S1504, Step S1505), the image processing controlling unit 703 compares the image quality mode that has switched the image processing parameter of the index number 2 by the last calculating request with the image quality mode included in the input information, and judges whether the image quality mode is changed (Step S1506).

When the image quality mode is changed (Step S1506: Yes), the image processing controlling unit 703 calculates the image processing parameter of the index number 2, and holds the calculated image processing parameter (Step S1507, Step S1508). Further, the image processing controlling unit 703 updates the image processing parameter of the index number 2 stored in the RAM 602*b* with the calculated image processing parameter. On the other hand, when the image quality mode is not changed (Step S1506: No), the image processing controlling unit 703 copies the image processing parameter of the index number 2 stored in the RAM 602*b* (Step S1509). More specifically speaking, the image processing controlling unit 703 holds the image processing parameter of the index number 2 stored in the RAM 602*b* as the calculated image processing parameter.

When the image processing parameter of the index number 2 is held (Step S1508, Step S1509) or the reading unit indicated by the reading-unit information is other than the scanner CCD 101 (Step S1501: indication of "other than it"), the image processing controlling unit 703 compares the type of the application and the reading-device information that have switched the image processing parameter of the index number 3 by the last calculating request with the type of the application included in the input information and the reading-device information included in the reading-unit information, and judges whether the type of the application and the reading-device information are changed (Step S1510).

When the type of the application and the reading-device information are changed (Step S1510: Yes), the image processing controlling unit 703 calculates the image processing parameter of the index number 3, and holds the calculated image processing parameter (Step S1511, Step S1512). Further, the image processing controlling unit 703 updates the image processing parameter of the index number 3 stored in the RAM 602*b* with the calculated image processing parameter. On the other hand, when the type of the application and the reading-device information are not changed (Step S1510: No), the image processing controlling unit 703 copies the image processing parameter of the index number 3 stored in the RAM 602*b* (Step S1513). More specifically speaking, the image processing controlling unit 703 holds the image processing parameter of the index number 3 stored in the RAM 602*b* as the calculated image processing parameter.

When the image processing parameter of the index number 3 is held (Step S1512, Step S1513), the image processing controlling unit 703 compares the color mode and the reading-device information that have switched the image processing parameter of the index number 4 by the last calculating request with the color mode included in the input information and the reading-device information included in the reading-unit information, and judges whether the color mode and the reading-device information are changed (Step S1514).

When the color mode and the reading-device information are changed (Step S1514: Yes), the image processing controlling unit 703 calculates the image processing parameter of the index number 4, and holds the calculated image processing parameter (Step S1515, Step S1516). Further, the image processing controlling unit 703 updates the image processing parameter of the index number 4 stored in the RAM 602*b* with the calculated image processing parameter. On the other hand, when the color mode and the reading-device information are not changed (Step S1514: No), the image processing controlling unit 703 copies the image processing parameter of the index number 4 stored in the RAM 602*b* (Step S1517). More specifically speaking, the image processing controlling unit 703 holds the image processing parameter of the index number 4 stored in the RAM 602*b* as the calculated image processing parameter.

Figure 16A:
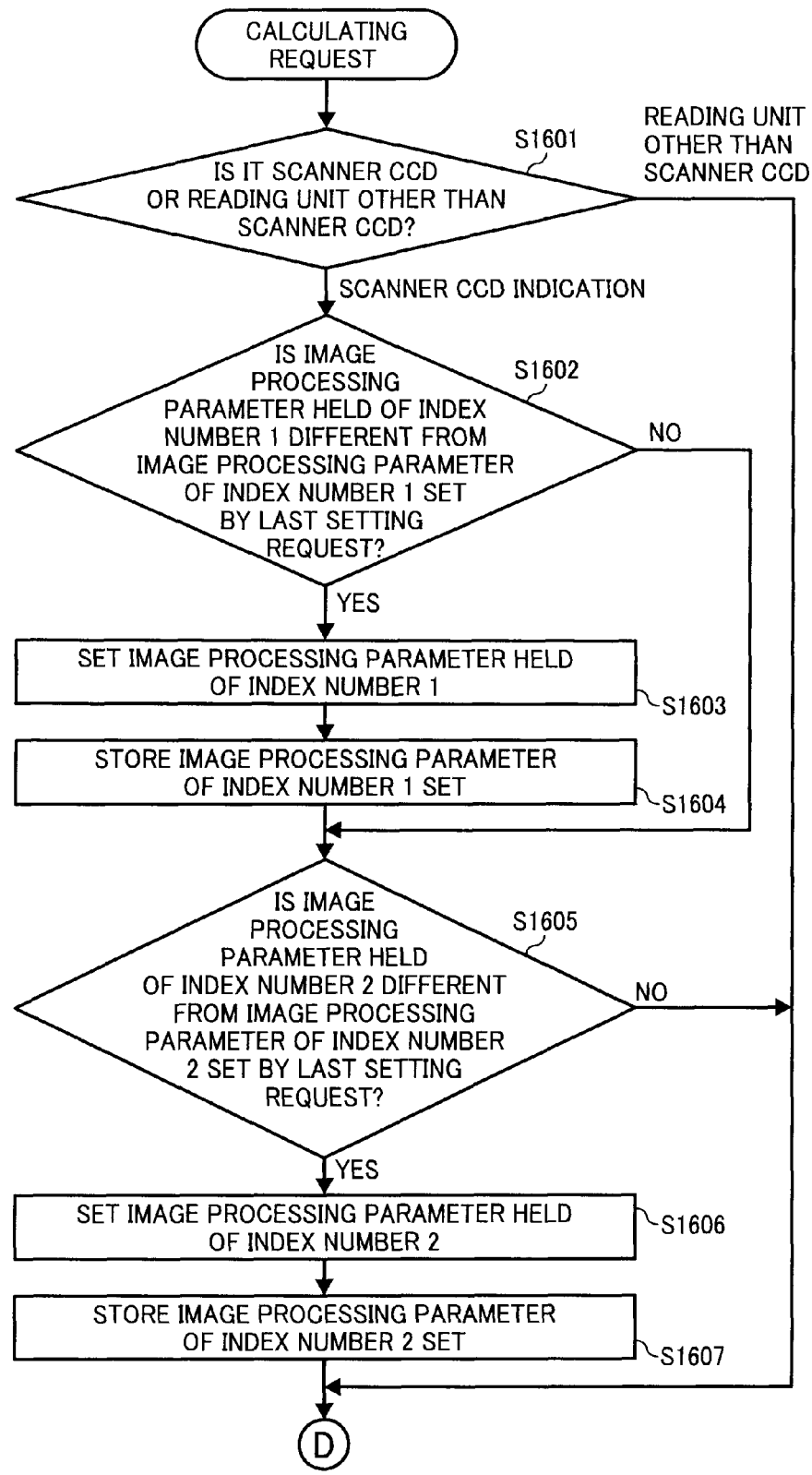
FIGS. 16A and 16B are flowcharts of operation performed by the image processing controlling unit for setting the image processing parameter of the adaptive gamma processing unit in the middleware unit according to the second embodiment.
Figure 16B:
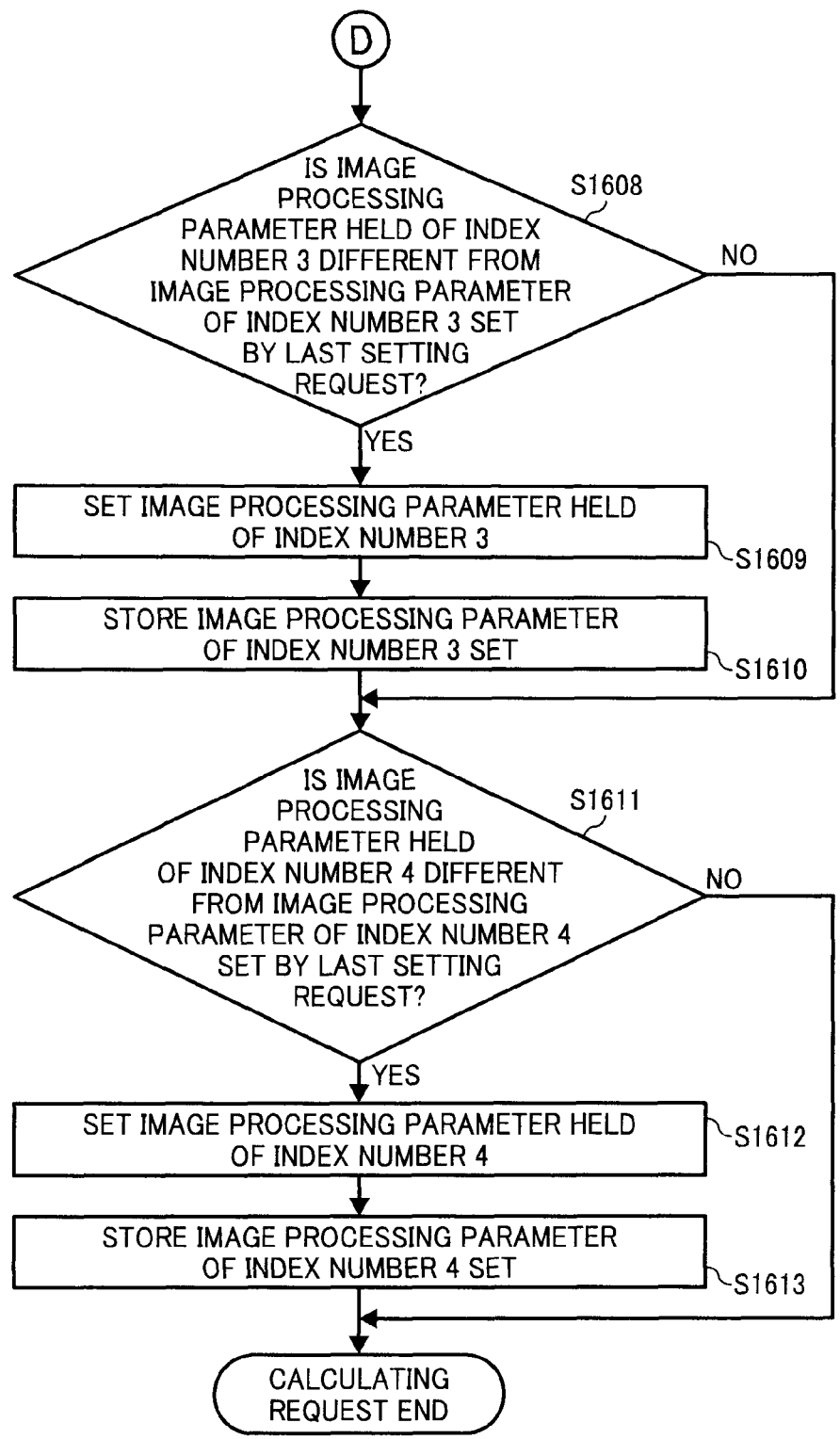

FIGS. 16A and 16B are flowcharts of operation performed by the image processing controlling unit 703 for setting in the middleware unit 109 the image processing parameter of the adaptive gamma processing unit 301. In the embodiment, the image processing controlling unit 703 stores in the RAM 602*b* the set result of the image processing parameter of the index number corresponding to at least the last setting request. In the embodiment, an example in which the image processing parameter of the adaptive gamma processing unit 301 of the middleware unit 109 is set is explained. Each of the image processing parameters of the hardware unit 108 and another image processing module of the middleware unit 109 is set in the same way as when the image processing parameter of the adaptive gamma processing unit 301 of the middleware unit 109 is set.

First, when the image processing controlling unit 703 receives the setting request from the host controlling unit 702, the image processing controlling unit 703 judges whether the reading unit indicated by the reading-unit information (for example, the reading-device information) included in the attached information is the scanner CCD 101 or the reading unit other than the scanner CCD 101 (Step S1601). When the reading unit indicated by the reading-unit information is the scanner CCD 101 (Step S1601: indication of the scanner CCD), the image processing controlling unit 703 judges whether the held image processing parameter of the index number 1 is different from the image processing parameter of the index number 1 set by the last setting request (Step S1602).

When the held image processing parameter of the index number 1 is different from the image processing parameter of the index number 1 set by the last setting request (Step S1602: Yes), the image processing controlling unit 703 sets the held image processing parameter of the index number 1 in the middleware unit 109 by downloading the computer program and the data in association with the held image processing parameter of the index number 1 into the middleware unit 109 (Step S1603). Further, the image processing controlling unit 703 stores into the RAM 602*b* the image processing parameter of the index number 1 set in the middleware unit 109 (Step S1604). When the held image processing parameter of the index number 1 is the same as the image processing parameter of the index number 1 set by the last setting request (Step S1602: No), the setting process of the image processing parameter of the index number 1 is not executed.

Next, when the image processing parameter of the index number 1 is stored into the RAM 602*b* (Step S1604) or the held image processing parameter of the index number 1 is the same as the image processing parameter of the index number 1 set by the last setting request (Step S1602: No), the image processing controlling unit 703 judges whether the held image processing parameter of the index number 2 is different from the image processing parameter of the index number 2 set by the last setting request (Step S1605).

When the held image processing parameter of the index number 2 is different from the image processing parameter of the index number 2 set by the last setting request (Step S1605: Yes), the image processing controlling unit 703 sets the held image processing parameter of the index number 2 in the middleware unit 109 by downloading the computer program and the data in association with the held image processing parameter of the index number 2 into the middleware unit 109 (Step S1606). Further, the image processing controlling unit 703 stores into the RAM 602*b* the image processing parameter of the index number 2 set in the middleware unit 109 (Step S1607). When the held image processing parameter of the index number 2 is the same as the image processing parameter of the index number 2 set by the last setting request (Step S1605: No), the setting process of the image processing parameter of the index number 2 is not executed.

Next, when the image processing parameter of the index number 2 is stored into the RAM 602*b* (Step S1607) or the held image processing parameter of the index number 2 is the same as the image processing parameter of the index number 2 set by the last setting request (Step S1605: No) or the reading unit indicated by the reading-unit information is other than the scanner CCD 101 (Step S1601: indication of "other than it"), the image processing controlling unit 703 judges whether the held image processing parameter of the index number 3 is different from the image processing parameter of the index number 3 set by the last setting request (Step S1608).

When the held image processing parameter of the index number 3 is different from the image processing parameter of the index number 3 set by the last setting request (Step S1608: Yes), the image processing controlling unit 703 sets the held image processing parameter of the index number 3 in the middleware unit 109 by downloading the computer program and the data in association with the held image processing parameter of the index number 3 into the middleware unit 109 (Step S1609). Further, the image processing controlling unit 703 stores into the RAM 602*b* the image processing parameter of the index number 3 set in the middleware unit 109 (Step S1610). When the held image processing parameter of the index number 3 is the same as the image processing parameter of the index number 3 set by the last setting request (Step S1608: No), the setting process of the image processing parameter of the index number 3 is not executed.

Next, when the image processing parameter of the index number 3 is stored into the RAM 602*b* (Step S1610) or the held image processing parameter of the index number 3 is the same as the image processing parameter of the index number 3 set by the last setting request (Step S1608: No), the image processing controlling unit 703 judges whether the held image processing parameter of the index number 4 is different from the image processing parameter of the index number 4 set by the last setting request (Step S1611).

When the held image processing parameter of the index number 4 is different from the image processing parameter of the index number 4 set by the last setting request (Step S1611: Yes), the image processing controlling unit 703 sets the held image processing parameter of the index number 4 in the middleware unit 109 by downloading the computer program and the data in association with the held image processing parameter of the index number 4 into the middleware unit 109 (Step S1612). Further, the image processing controlling unit 703 stores into the RAM 602*b* the image processing parameter of the index number 4 set in the middleware unit 109 (Step S1613). When the held image processing parameter of the index number 4 is the same as the image processing parameter of the index number 4 set by the last setting request (Step S1611: No), the setting process of the image processing parameter of the index number 4 is not executed.

As described above, because the MFP 100 according to the second embodiment of the present invention executes the setting process for the image processing parameter when the image data obtained by reading the back side of the document is subjected to the image processing by using the image processing parameter set in the image processing device when the image data obtained by reading the front side of the document is subjected to the image processing, when the image data obtained by reading the back side of the document is subjected to the image processing, the MFP 100 has only to set the image processing parameter different from the image processing parameter set when the image data obtained by reading the front side of the document is subjected to the image processing. Thus, processing time needed for setting the image processing parameter is shortened, and processing of software needed for the setting process for the image processing parameter is reduced. Thus, it is possible to achieve high productivity in the MFP 100.

FIG. 17 is an example of a table (data) indicating the image processing parameter used in the embodiment. The table shown in FIG. 17 is the example in which P (computer program number) and D (data number) that correspond to the index number of the image processing parameter set in the middleware unit 109 are determined by request levels 1 to 3, and a scaling factor. The request level is the controlling factor shown in FIG. 14 that a user designates through the operation display unit 105 such as the type of the application, the image quality mode, and the reading-unit information.

FIG. 18 is an example of a table indicating the image processing parameter set in the middleware unit 109 according to the second embodiment of the present invention. In the embodiment, the table of the image processing parameter set in the adaptive gamma processing unit 301 of the middleware unit 109 is explained. The table of the image processing parameter set in the hardware unit 108 is basically the same as the table of the image processing parameter set in the adaptive gamma processing unit 301 of the middleware unit 109. More specifically speaking, the table of the image processing parameter set in the hardware unit 108 differs from the table of the image processing parameter set in the adaptive gamma processing unit 301 of the middleware unit 109 in that the table of the image processing parameter set in the hardware unit 108 does not include the information indicating a computer program. On the other hand, the table of the image processing parameter set in the middleware unit 109 includes the information indicating the computer program (for example, the computer program A), and the information indicating data (for example, the data A (gamma data)). The computer program is the computer program based on which the middleware unit 109 executes the image processing after the computer program is actually downloaded into the middleware unit 109. In the embodiment, the computer program is formed by using array, and represented as a hexadecimal number. The data is the data that the computer program downloaded into the middleware unit 109 refers to when the computer program executes the image processing. The data is, for example, the data needed for threshold value processing or gamma data and the like. The computer program and the data that are downloaded into the middleware unit 109 are used as numbers indicating the element of the table shown in FIG. 17 and the array element (const area) thereof. The computer program and the data are written into the middleware unit 109 with 8 bits width or 16 bits width.

FIG. 19 is an example of the table indicating the image processing parameter set in the hardware unit 108 according to the second embodiment of the present invention. In the embodiment, the element (the image processing parameter) of the table shown in FIG. 19 is set to a group of registers (registers A to Z) provided in advance in the hardware unit 108 by using the table (const area) having the same amount of data as the amount of the table shown in FIG. 19 in accordance with data assigned on a bit-by-bit basis. In the embodiment, a simple example of the actually set image processing parameter is shown. The image processing parameter set in the hardware unit 108 is managed by the table called data, and is 8 bit or 16 bit numbers corresponding to the element thereof.

The variations shown in FIG. 18 and FIG. 19 correspond to the index numbers of P (computer program number) and D (data number) shown in FIG. 17. The image processing parameter indicated by P number and D number stored in the ROM 602a is set to the middleware unit 109 in accordance with the index number of the image processing parameter calculated by the image processing controlling unit 703. The computer program includes hexadecimal array data. When the object to which the image processing parameter is set is the hardware unit 108, the image processing parameter indicated by the D number stored in the ROM 602a is set to the hardware unit 108.

As described above, according to an aspect of the present invention, because the processing to correct the difference of the reading characteristics between the plurality of the reading units is performed, the image quality difference between the printed images of the image data that have been read by the reading units that have the reading characteristics different from each other can be reduced. Moreover, because the reading-unit information as well as the image data is stored in the secondary memory unit, even if the image data stored in the secondary memory unit is reprinted after some time has elapsed, it is possible to reduce the image quality difference between the printed images of the image data that have been read by the reading units that have the reading characteristics different from each other.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a plurality of reading units that separately and concurrently read a front side of a document and a back side of the document thereby acquiring image data;
a first calculating unit that calculates a first image processing parameter to reduce a difference in image qualities between the image data read by the reading units based on a reading characteristic of the reading unit that has read the image data;
a first image processing unit that sets the first image processing parameter and performs image processing on the image data based on the first image processing parameter thereby obtaining processed data;
a storing unit that stores therein the processed data with reading-unit information indicating the reading unit that has read the image data corresponding to the processed data;
a second calculating unit that calculates a second image processing parameter to reduce a difference in image qualities between the image data read by the reading units based on a reading characteristic of the reading unit indicated by the reading-unit information stored with the image processed data and a writing characteristic of a writing unit when the processed data stored in the storing unit is to be printed by the writing unit;
a second image processing unit that sets the second image processing parameter and performs image processing on the processed data stored in the storing unit based on the second image processing parameter thereby obtaining printing data; and
a printing unit that causes the writing unit to print the printing data.

2. The image forming apparatus according to claim 1, wherein the second calculating unit calculates the second image processing parameter based on the writing characteristic of the writing unit and an intermediate value of the reading characteristics of the reading units when a plurality of the printing data are to be printed on one paper sheet in a consolidated manner.

3. The image forming apparatus according to claim 1, wherein the reading-unit information includes at least one of reading-device information of the reading unit, document-side information of the document read by the reading unit, and reading-method information of the reading unit.

4. The image forming apparatus according to claim 1, wherein the second calculating unit calculates the second image processing parameter for gradation processing.

5. The image forming apparatus according to claim 1, wherein the second calculating unit calculates the second image processing parameter for gamma processing.

6. The image forming apparatus according to claim 1, wherein when the first calculating unit and the second calculating unit calculate the first image processing parameter and the second image processing parameter that are to be used for the image processing of the image data obtained by reading the back side of the document respectively, the first calculating unit and the second calculating unit calculate only the first image processing parameter and the second image processing parameter respectively different from the first image processing parameter and the second image processing parameter that are used for the image processing of the image data of the front side of the document, and
the first image processing unit and the second image processing unit reset only the calculated first image processing parameter and the calculated second image processing parameter respectively different from the first image processing parameter and the second image processing parameter that are used for the image processing of the image data of the front side of the document.

7. An image forming method comprising:
reading a front side of a document and a back side of the document separately and concurrently by a plurality of reading units thereby acquiring image data;
first calculating including calculating a first image processing parameter to reduce a difference in image qualities between the image data read by the reading units based on a reading characteristic of the reading unit that has read the image data;
first image-processing including setting the first image processing parameter and performing image processing on the image data based on the first image processing parameter thereby obtaining processed data;
storing the processed data in a storing unit with reading-unit information indicating the reading unit that has read the image data corresponding to the processed data;
second calculating including calculating a second image processing parameter to reduce a difference in image qualities between the image data read by the reading units based on a reading characteristic of the reading unit indicated by the reading-unit information stored with the image processed data and a writing characteristic of a writing unit when the processed data stored in the storing unit is to be printed by the writing unit;

second image-processing including setting the second image processing parameter and performing image processing on the processed data stored in the storing unit based on the second image processing parameter thereby obtaining printing data; and causing the writing unit to print the printing data.

8. The image forming method according to claim 7, wherein the second calculating includes calculating the second image processing parameter based on the writing characteristic of the writing unit and an intermediate value of the reading characteristics of the reading units when a plurality of the printing data are to be printed on one paper sheet in a consolidated manner.

9. The image forming method according to claim 7, wherein the reading-unit information includes at least one of reading-device information of the reading unit, document-side information of the document read by the reading unit, and reading-method information of the reading unit.

10. The image forming method according to claim 7, wherein the second calculating includes calculating the second image processing parameter for gradation processing.

11. The image forming method according to claim 7, wherein the second calculating includes calculating the second image processing parameter for gamma processing.

12. The image forming method according to claim 7, wherein when the first calculating and the second calculating calculate the first image processing parameter and the second image processing parameter that are to be used for the image processing of the image data obtained by reading the back side of the document respectively, the first calculating unit and the second calculating unit calculate only the first image processing parameter and the second image processing parameter respectively different from the first image processing parameter and the second image processing parameter that are used for the image processing of the image data of the front side of the document, and the first image-processing and the second image-processing reset only the calculated first image processing parameter and the calculated second image processing parameter respectively different from the first image processing parameter and the second image processing parameter that are used for the image processing of the image data of the front side of the document.

* * * * *